(12) United States Patent
Geiger

(10) Patent No.: US 12,680,626 B2
(45) Date of Patent: Jul. 14, 2026

(54) STRETCH-MOUNT CLAMP ASSEMBLIES

(71) Applicant: HellermannTyton Corporation,
Milwaukee, WI (US)

(72) Inventor: Gerard G. Geiger, Jackson, WI (US)

(73) Assignee: HellermannTyton Corporation,
Milwaukee, WI (US)

( * ) Notice: Subject to any disclaimer, the term of this patent is extended or adjusted under 35 U.S.C. 154(b) by 0 days.

(21) Appl. No.: 18/783,859

(22) Filed: Jul. 25, 2024

(65) Prior Publication Data

US 2025/0084934 A1 Mar. 13, 2025

Related U.S. Application Data

(60) Provisional application No. 63/581,831, filed on Sep. 11, 2023.

(51) Int. Cl.
| | |
|---|---|
| *F16L 3/00* | (2006.01) |
| *F16L 3/123* | (2006.01) |
| *F16L 3/137* | (2006.01) |
| *F16L 3/233* | (2006.01) |

(52) U.S. Cl.
CPC ............. *F16L 3/137* (2013.01); *F16L 3/1233* (2013.01); *F16L 3/233* (2013.01)

(58) Field of Classification Search
None
See application file for complete search history.

(56) References Cited

U.S. PATENT DOCUMENTS

| | | | |
|---|---|---|---|
| 2,331,098 | A | 10/1943 | White et al. |
| 2,399,899 | A | 5/1946 | Tinnerman |
| 3,041,025 | A | 6/1962 | Daly |
| 3,139,253 | A | 6/1964 | Crawford et al. |

(Continued)

FOREIGN PATENT DOCUMENTS

| | | |
|---|---|---|
| CN | 202848332 | 4/2013 |
| CN | 207625215 | 7/2018 |

(Continued)

OTHER PUBLICATIONS

"Extended European Search Report", EP Application No. 24191641.0, Jan. 27, 2025, 7 pages.

(Continued)

*Primary Examiner* — Steven M Marsh
(74) *Attorney, Agent, or Firm* — Colby Nipper PLLC

(57) ABSTRACT

A stretch-mount clamp assembly may include a first connector of a first non-elastic material, a second connector of a second non-elastic material, and a tension device that includes an elastic material. The first connector having an inner side opposite an outer side, the first connector including a first retainer extending from the inner side of the first connector. The second connector having an inner side opposite an outer side, the second connector including a second retainer extending from the inner side of the second connector. The tension device connects the inner sides of the first connector and the second connector. The tension device includes a first overmold portion that is overmolded onto at least a portion of the first retainer to form a first mechanical interlock and a second overmold portion that is overmolded onto at least a portion of the second retainer to form a second mechanical interlock.

11 Claims, 9 Drawing Sheets

(56) References Cited

U.S. PATENT DOCUMENTS

| | | | |
|---|---|---|---|
| 3,621,107 A | 11/1971 | Buvendack | |
| 3,632,071 A | 1/1972 | Cameron et al. | |
| 3,916,488 A | 11/1975 | Gazda et al. | |
| 4,001,898 A | 1/1977 | Caveney | |
| 4,609,171 A | 9/1986 | Matsui | |
| 4,728,064 A | 3/1988 | Caveney | |
| 4,866,816 A | 9/1989 | Caveney | |
| 5,103,534 A | 4/1992 | Caveney | |
| 5,146,654 A | 9/1992 | Caveney et al. | |
| 5,154,376 A | 10/1992 | Baum et al. | |
| 5,305,978 A | 4/1994 | Current | |
| 5,368,261 A | 11/1994 | Caveney et al. | |
| 5,419,475 A * | 5/1995 | Naritomi | A45C 13/30 |
| | | | 224/264 |
| 5,531,480 A | 7/1996 | Foertsch | |
| 5,685,048 A | 11/1997 | Benoit | |
| 5,836,053 A | 11/1998 | Davignon et al. | |
| 5,890,265 A | 4/1999 | Christian et al. | |
| 5,966,781 A | 10/1999 | Geiger | |
| 6,138,327 A | 10/2000 | Powell et al. | |
| 6,543,094 B2 | 4/2003 | D'addario | |
| 7,437,804 B1 | 10/2008 | Geiger et al. | |
| 7,503,528 B2 | 3/2009 | Adams et al. | |
| 8,028,962 B2 | 10/2011 | Geiger | |
| 8,510,918 B2 * | 8/2013 | Shilale | B65D 63/1072 |
| | | | 24/16 PB |
| 8,601,649 B2 | 12/2013 | Klein et al. | |
| 8,726,468 B2 | 5/2014 | Dyer | |
| 9,021,665 B2 | 5/2015 | Chen | |
| 9,242,590 B2 | 1/2016 | Preston | |
| 9,321,571 B2 | 4/2016 | Griggio | |
| 9,387,611 B2 | 7/2016 | Dyer et al. | |
| 9,416,905 B2 | 8/2016 | Weeden | |
| 9,899,822 B2 | 2/2018 | Richardson et al. | |
| 9,927,057 B2 | 3/2018 | Dyer et al. | |
| 9,938,062 B1 | 4/2018 | Scarlett | |
| 10,065,777 B2 | 9/2018 | King | |
| 10,119,631 B2 | 11/2018 | Toll et al. | |
| 10,336,519 B2 | 7/2019 | King | |
| D874,293 S | 2/2020 | King | |
| 10,689,173 B2 | 6/2020 | King | |
| 10,745,182 B1 * | 8/2020 | Reznar | B65D 63/1072 |
| D912,503 S | 3/2021 | King | |
| 11,326,719 B2 | 5/2022 | Courbis et al. | |
| 11,355,905 B2 | 6/2022 | Toll et al. | |
| 11,505,378 B2 | 11/2022 | Geiger et al. | |
| 2002/0071715 A1 | 6/2002 | Geiger | |
| 2002/0104196 A1 | 8/2002 | Geiger | |
| 2003/0222184 A1 | 12/2003 | Geiger | |
| 2004/0076465 A1 | 4/2004 | Geiger | |
| 2005/0242247 A1 | 11/2005 | Geiger | |
| 2005/0279893 A1 * | 12/2005 | Rapp | F16L 3/133 |
| | | | 248/74.3 |
| 2006/0162130 A1 | 7/2006 | Cook | |
| 2007/0102594 A1 | 5/2007 | Geiger et al. | |
| 2007/0180662 A1 * | 8/2007 | Heath | F16L 3/137 |
| | | | 24/25 |
| 2011/0068234 A1 | 3/2011 | Schaety et al. | |
| 2012/0217355 A1 | 8/2012 | Geiger et al. | |
| 2012/0242071 A1 | 9/2012 | Coleman | |
| 2013/0119208 A1 | 5/2013 | Geiger | |
| 2014/0373312 A1 | 12/2014 | Griggio | |
| 2016/0001943 A1 | 1/2016 | Harsley | |
| 2016/0223100 A1 | 8/2016 | Geiger | |
| 2017/0122459 A1 | 5/2017 | Haynes et al. | |
| 2017/0210527 A1 | 7/2017 | Breeling | |
| 2018/0142713 A1 | 5/2018 | Courbis | |
| 2018/0187703 A1 | 7/2018 | Kuperus | |
| 2018/0231044 A1 | 8/2018 | Bejin et al. | |
| 2018/0252336 A1 * | 9/2018 | Erkelens | F16L 3/137 |
| 2019/0210779 A1 | 7/2019 | Vaverka | |
| 2019/0218006 A1 | 7/2019 | Matz | |
| 2020/0039711 A1 | 2/2020 | Kuperus | |
| 2020/0102979 A1 | 4/2020 | Bejin et al. | |
| 2020/0223606 A1 | 7/2020 | Matz | |
| 2020/0224797 A1 | 7/2020 | Courbis | |
| 2022/0024659 A1 | 1/2022 | Thomas | |
| 2022/0112970 A1 | 4/2022 | Vaccaro et al. | |
| 2023/0099187 A1 | 3/2023 | Lindner | |
| 2025/0083587 A1 | 3/2025 | Geiger | |
| 2025/0129813 A1 | 4/2025 | Toll et al. | |

FOREIGN PATENT DOCUMENTS

| | | |
|---|---|---|
| CN | 210204837 | 3/2020 |
| CN | 111891557 | 11/2020 |
| CN | 213503869 | 6/2021 |
| CN | 213863506 | 8/2021 |
| CN | 215400499 | 1/2022 |
| DE | 202014003417 | 4/2015 |
| DE | 102021105085 | 9/2021 |
| EP | 2281717 A2 | 2/2011 |
| KR | 20030056006 | 7/2003 |
| KR | 20090099790 | 9/2009 |
| WO | 2017202783 | 11/2017 |
| WO | 2017202784 | 11/2017 |
| WO | 2019089663 | 5/2019 |

OTHER PUBLICATIONS

"Extended European Search Report", EP Application No. 24198512.6, Jan. 28, 2025, 9 pages.

"24IN Perfect Bungee STRP NLN HK RD", Retrieved at: https://www.grainger.ca/en/product/24IN-PERFECT-BUNGEE-STRP-NLN-HK-RD/p/DUKCPBNH24R—on Jul. 17, 2024, 2 pages.

"2-Way Saddle Mount for 6mm & 1/4" Bolts with Hexagonal Retention", Retrieved at: https://assets. hellermanntyton.us/m/cf4a3718ff081071/original/mt2025011cst-pdf.pdf—on Nov. 17, 2023, 1 page.

"3" Quick Fist Clamp—Item #50050", Retrieved at: https://quickfist.com/3-quick-fist-clamp.html—on Jul. 17, 2024, 3 pages.

"Cable Tie Mounts, Saddle Type, Polyamide,9.0MM Max. Tie Width,5.0MM Mounting Hole", Retrieved at: https://www.hwlok.com/en/product/Cable-Tie-MountsSaddle-TypePolyamide9.0mm-Max.-tie-width5.0mm-Mounting-Hole/TM-1A10.html—on Nov. 17, 2023, 7 pages.

"CTM Series Cable Tie Mount", Retrieved at: https://www.hellermanntyton.com/shared/datasheets/CAD_16-1331-010_CSU.pdf—on Nov. 17, 2023, 1 page.

"Dust Right Dust Hose Mounting Bracket", ROC—Retrieved at: https://www.rockler.com/dust-right-dust-hose-mounting-bracket—on Feb. 28, 2024, 9 pages.

"Handelok—1004 Drawing", https://pactoolmounts.com/wp-content/uploads/2017/07/1004-2D-Drawings.pdf, Apr. 10, 2018, 1 page.

"Handlelok—1004", Retrieved at: https://pactoolmounts.com/product/handlelok-1004-2/—on Nov. 17, 2023, 8 pages.

"Long Arm Quick Fist Clamp—Item #40010", Retrieved at: https://quickfist.com/long-arm-quick-fist-clamp.html—on Jul. 17, 2024, 3 pages.

"Mini Quick Fist Clamp—Item #30050", Retrieved at: https://quickfist.com/mini-quick-fist-5-8-to-1-3-8.html—on Jul. 17, 2024, 3 pages.

"Notice of Allowance", U.S. Appl. No. 16/940,262, Jun. 11, 2021, 7 pages.

"Original Quick Fist Clamp—Item #10010", Retrieved at: https://quickfist.com/quick-fist-clamp.html—on Jul. 17, 2024, 4 pages.

"PAC Tool Handlelok Mounting Bracket", Retrieved at: https://www.thefirestore.com/PAC-Tool-Handlelok-Mounting-Bracket—on Jul. 25, 2023, 3 pages.

"Releasable Cable Tie", Retrieved at: https://www.hellermanntyton.com/products/cable-ties-releasable/srt1807/115-07189#downloadsanchor—on Nov. 17, 2023, 5 pages.

"Rhino Grip Flex 1.5—Pair", Retrieved at: https://www.kolpin.com/en-us/shop/accessories/gun-transport-carriers/rhino-grips/flex/rhino-grip-flex-15/—on Nov. 17, 2023, 3 pages.

"Rhino Grip® Flex 1.5—Pair Item #: 21570", Retrieved at: https://www.kolpin.com/en-us/shop/accessories/gun-transport-carriers/rhino-grips/flex/rhino-grip-flex-15/—on Jul. 17, 2024, 3 pages.

(56) References Cited

OTHER PUBLICATIONS

"Rhino Grip® Flex 3.0—Pair", Retrieved at: https://www.kolpin.com/en-us/shop/accessories/gun-transport-carriers/rhino-grips/flex/rhino-grip-3/—on Nov. 17, 2023, 3 pages.

"Rhino Grip® Flex 3.0—Pair Item #: 21571", Retrieved at: https://www.kolpin.com/en-us/shop/accessories/gun-transport-carriers/rhino-grips/flex/rhino-grip-3/—on Jul. 17, 2024, 3 pages.

"Softbinder / Soft Tie SRT260-11", https://www.hellermanntyton.com/shared/datasheets/CAD_141854.pdf, Apr. 20, 2010, 1 page.

"Softbinder / Soft Tie SRT880-28", Retrieved at: https://www.hellermanntyton.com/shared/datasheets/CAD_141443.pdf—on Jul. 17, 2024, 1 page.

"Square Quick Fist Clamp—Item #25010", Retrieved at: https://quickfist.com/square-quick-fist-clamp-item-25010.html—on Jul. 17, 2024.

"Super Quick Fist Clamp—Item #20020", Retrieved at: https://quickfist.com/super-quick-fist-clamp.html—on Jul. 17, 2024, 3 pages.

"TB-Softbinder SRT", https://www.hellermanntyton.com/shared/datasheets/CAD_141857.pdf, Apr. 18, 2010, 1 page.

"The Perfect Bungee by BihlerFlex, PC12R Easy Stretch Cord, 12", Red", Retrieved at: https://www.amazon.com/Perfect-Bungee-BihlerFlex-PC12R-Stretch/dp/B002KWDFAI—on Jul. 17, 2024, 15 pages.

"Uplift Adhesive Readjustable Cable Tie Mounts", Retrieved at: https://www.thehumansolution.com/uplift-adhesive-readjustable-cable-tie-mounts.html—on Nov. 17, 2023, 3 pages.

"Restriction Requirement", U.S. Appl. No. 18/775,821, filed Feb. 17, 2026, 6 pages.

"Plastic and steel cable clamps for industry", Retrieved at: https://www.hellermanntyton.com/competences/cable-clamps—on Apr. 22, 2026, 10 pages.

"5/8" Bundle Dia, 3/8" Hole, Steel Clamp", Retrieved at: https://www.mscdirect.com/product/details/43587203—on Apr. 22, 2026, 2 pages.

"Heyco Heavy Duty Lockit P Clamps", Retrieved at: https://www.elecdirect.com/catalog/category/view/s/heavy-duty-lockit-p-clamps/id/36264/—on Apr. 22, 2026, 6 pages.

"RAYCHEM P-Clamps TE Internal #: EM7082-000", Retrieved at: https://www.te.com/en/product-EM7082-000.html - on Apr. 22, 2026, 4 pages.

"Cable Mounting & Accessories—Mouser #: 523-PCL400110", Retrieved at: https://www.mouser.com/ProductDetail/Amphenol-PCD/PCL400110?qs=y5Hg/HGF7cOo3J/BMjCQ1w%3D%3D—on Apr. 22, 2026, 3 pages.

"U-Snap Clamps", Retrieved at: https://www.amphenolpcd.com/product/u-snap-clamps/—on Apr. 22, 2026, 2 pages.

"Cbl Clip Wire Saddle Fastener—ARC.68-S6-Q14", Retrieved at: https://www.digikey.com/en/products/detail/panduit-corp/ARC-68-S6-Q14/1306590—on Apr. 22, 2026, 5 pages.

"Fastener, Clincher Adhesive Mt, Adjustable Releasable Cable Clamp, 71.3 mm, PP (Polypropylene)", Retrieved at: https://www.newark.com/panduit/arc-68-a-c14/cable-fastener/dp/76F869—on Apr. 22, 2026, 3 pages.

"Panduit ARC.68-S6-C Clincher, M3 Screw, White", Retrieved at: https://www.amazon.sg/Panduit-ARC-68-S6-C-Clincher-Screw-White/dp/B015A5OL36—on Apr. 22, 2026, 3 pages.

"Essentra Components 22AAWC310400 Adjustable Adhesive Backed Wire Clamp, 1/32, .390 Max. Wire Bundle", Retrieved at: https://www.waytekwire.com/brands/essentra-components/Adhesive-Backed-Clamps/essentra-components-22aawc310400-adjustable-adhesive-clamp—on 04/22/206, 4 pages.

"SOULWIT 50Pcs Adjustable Cable Management Clips, Adhesive Organizers Sticky Wire Clips Cord Holder for Tv Pc Ethernet Under Desk Wall Home Office", Retrieved at: https://www.amazon.com/SOULWIT-Adjustable-Management- Adhesive-Organizers/dp/B09VXNRJDN?th=1 - on 04/22/206, 9 pages.

"Non-Final Office Action", U.S. Appl. No. 18/775,821, filed Jun. 4, 2026, 15 pages.

* cited by examiner

STRETCH-MOUNT CLAMP ASSEMBLIES

CROSS-REFERENCE TO RELATED APPLICATION(S)

This application claims the benefit of U.S. Provisional Patent Application Ser. No. 63/581,831, filed on Sep. 11, 2023, the disclosure of which is incorporated by reference herein in its entirety.

BACKGROUND

A mounting clamp, also referred to as a mounting clamp assembly, is a fastening device that can be utilized to secure one or more objects relative to a support structure (e.g., a mounting surface, a mount, a vehicle chassis, a trailer, a bracket, or the like). A mounting clamp may further be utilized to combine one or more elongated objects (e.g., wires, harnesses, hoses, tubes, cables, and the like) into a bundle, which may, in turn, be secured to the support structure.

An example mounting clamp assembly includes a first connector hingedly connected to a second connector, the first and second connectors configured for surrounding an elongated object or bundle and connecting with one another. A common type of a mounting clamp assembly is referred to as a "P-clamp." A P-clamp is named thus due to its shape, which can be "P" shaped. A P-clamp includes a first connector hingedly connected to a second connector and a mount (e.g., a flange extending from one of the first connector or the second connector).

Another example mounting clamp assembly is referred to as a clamp tie. A clamp tie includes a locking head and flexible straps that extend therefrom. In aspects, the flexible straps extend from opposing sides of the locking head. The flexible straps are configured to be insertable through the locking head to form spaced loops. First and second pawl mechanisms in the locking head are used to secure the straps in a looped configuration. An aperture may be provided through the locking head for securing the clamp tie to a support structure.

SUMMARY

This document describes stretch-mount clamp assemblies. A stretch-mount clamp assembly may be utilized to secure an object relative to a support structure. In aspects, a stretch-mount clamp assembly may be utilized to combine one or more elongated objects into a bundle, which may be connected to a support structure. Examples of stretch-mount clamp assemblies include stretch band clamps and hybrid clamp ties.

In some aspects, the stretch mount clamp assemblies described herein relate to a stretch-mount clamp assembly including: a first connector including a first non-elastic material, the first connector having an inner side opposite an outer side, the first connector including a first retainer extending from the inner side of the first connector; a second connector including a second non-elastic material, the second connector having an inner side opposite an outer side, the second connector including a second retainer extending from the inner side of the second connector; and a tension device including an elastic material, the tension device connecting the inner side of the first connector to the inner side of the second connector, the tension device including a first overmold portion that is overmolded onto at least a portion of the first retainer to form a first mechanical interlock and a second overmold portion that is overmolded onto at least a portion of the second retainer to form a second mechanical interlock.

In some aspects, the stretch mount clamp assemblies described herein relate to a stretch-mount clamp assembly including: a first connector including a first non-elastic material, the first connector having an inner side opposite an outer side, the first connector including a first retainer extending from the inner side of the first connector; a mount portion including a second non-elastic material, the mount portion having a first end opposite a second end, the mount portion including a first center retainer extending from the mount portion first end and a second center retainer extending from the mount portion second end; a first tension device including a first elastic material, the first tension device connecting the inner side of the first connector to the first end of the mount portion, the first tension device including a first overmold portion that is overmolded onto at least a portion of the first retainer to form a first mechanical interlock and a second overmold portion that is overmolded onto at least a portion of the first center retainer to form a second mechanical interlock; a second connector including a third non-elastic material, the second connector having an inner side opposite an outer side, the second connector including a second retainer extending from the inner side of the second connector; and a second tension device including a second elastic material, the second tension device connecting the inner side of the second connector to the second end of the mount portion, the second tension device including a third overmold portion that is overmolded onto at least a portion of the second retainer to form a third mechanical interlock and a fourth overmold portion that is overmolded onto at least a portion of the second center retainer to form a fourth mechanical interlock.

This Summary is provided to introduce simplified concepts of stretch-mount clamp assemblies, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of stretch-mount clamp assemblies are described with reference to the following Drawings, in which the use of the same numbers in different instances may indicate like features and/or components. In some views, broken lines are utilized to indicate an indeterminate length.

DETAILED DESCRIPTION

Figures 1, 1A, 1B:
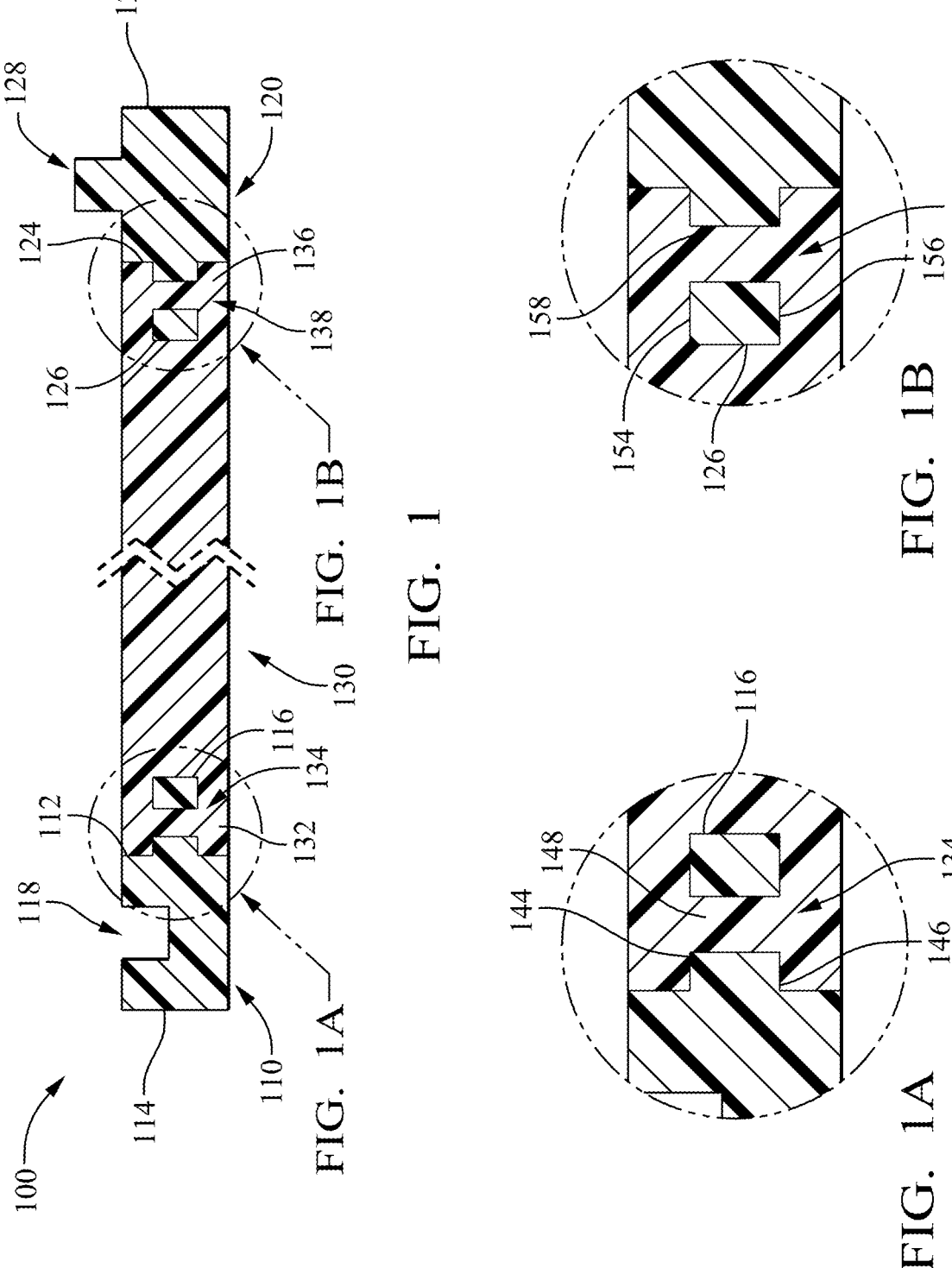
FIG. 1 is a schematic representation of a stretch-mount clamp assembly.
FIG. 1A is a first detail view of the stretch-mount clamp assembly of FIG. 1.
FIG. 1B is a second detail view of the stretch-mount clamp assembly of FIG. 1.

This document describes techniques and apparatuses directed to stretch-mount clamp assemblies. Optional features of one aspect described herein may be combined with other aspects to form further aspects.

The term "elastic," as used herein, means a material (e.g., an "elastic material") that exhibits recovery from stretching or deformation in at least one direction, unless the context indicates otherwise. For example, elastic refers to a material that, upon application of a biasing force, is stretchable from an original relaxed length and that will recover to substantially the original relaxed length upon release of the stretching, elongating force.

An elastic material may have isotropic (same in all directions) properties and a high Poisson's ratio. The Poisson's ratio is a measure of the Poisson effect—the deformation (expansion or contraction) of a material in directions perpendicular to a specific direction of loading. The value of the Poisson's ratio is the negative of the ratio of transverse strain to axial strain. For small values of these changes, the Poisson's ratio is the amount of transversal elongation divided by the amount of axial compression (e.g., $-\Delta$Width (or $-\Delta$Thickness)/$\Delta$Length).

An elastic material may possess high intrinsic stretchability (e.g., 500% elongation). The amorphous structure of a suitable elastic material may contain polymer chain entanglement or entropy that contains molecular chain voids or greater free volume among the chains. During stretching, the molecular chains may reorient and align. When this happens, the free volume between the molecular chains may decrease and the overall elastic material volume may decrease while the density increases-all due to increasing chain orientation. During such a transformation, frictional grip strength properties may improve between the elastic material portion(s) when the elastic material is stretched and secured around a bundle. Also, applied circumferential force of a stretch-mount clamp assembly during installation assembly may be a factor that may increase the normal force of the elastic material against the bundle, which further may increase the frictional grip strength.

In aspects, a suitable elastic material may have a minimum elongation of at least 100%, a Shore A hardness of approximately 50 to 70, and under-the-hood applications up to 125° C. cyclic operating temperature.

An elastic material may be a thermoplastic elastomeric high-stretch material (e.g., a thermoplastic high-stretch elastomer). Examples of elastic materials for the stretch-band fixings disclosed herein include, but are not limited to, butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber), styrene-butadiene, styrene-butadiene rubber (SBR), silicone rubber, polybutadiene, thermoplastic elastomers (TPE) (e.g., thermoplastic rubbers, styrenic block copolymers (thermoplastic styrenics) (TPS), thermoplastic polyolefinelastomers (thermoplastic olefin) (TPO), thermoplastic vulcanizates (TPV), thermoplastic polyurethanes (TPU), thermoplastic urethane, thermoplastic copolyester (TPC) (e.g., thermoplastic polyester elastomers (TPC-ET)), thermoplastic polyamides (TPA), styrene ethylene butadiene styrene (SEBS), and the like), poly(styrene-butadiene-styrene) (SBS), polybutylene terephthalate (PBT) and polytetramethylene glycol (PTMG) copolymer, synthetic rubber, foam rubber, silicone rubber, urethane, elastomer, and the like, other rubber-like materials, and copolymers, blends, and alloys thereof.

As used herein, the term "non-elastic" means any material (e.g., a "non-elastic material") that does not fall within the definition of "elastic" above. In aspects, a non-elastic material is a flexible, longitudinally tension-resistant material. Examples of non-elastic materials for stretch-mount clamp assemblies disclosed herein include, but are not limited to, metal, polymeric materials (e.g., polyamide (PA), polypropylene (PP), polyethylene (PE), polyphenylene sulfide (PPS), polyether ether ketone (PEEK), polyaryletherketone (PAEK), ethylene tetrafluoroethylene (ETFE), polyacetal (POM), polybutylene terephthalate (PBT), ultraviolet (UV) stabilized polyacetal (POMUV), cross-linked thermoplastics, partially cross-linked thermoplastics, higher-temperature resins, UV resistant resins, other thermoplastic materials, and the like, and copolymers, blends, or alloys thereof). In aspects, a non-elastic material may include one or more additives (e.g., heat stabilizers (e.g., copper iodide), impact modifiers (e.g., polyolefin, urethane, rubber), UV stabilizers (e.g., carbon black, hindered amine light stabilizers (HALS)), flame retardants (e.g., nitrogen-based halogen-free flame retardants, melamine cyanurate, melamine borate, ammonium polyphosphate), colorants, and the like).

In aspects, an elastic material and a non-elastic material used together in a stretch-mount clamp assembly are chemically compatible and/or thermally compatible, enabling a chemical bond or other adhesion to form between the two materials. The chemical bond increases the strength of a connection and/or a mechanical interlock located between the two materials.

Described herein and illustrated in the Drawings are aspects of stretch-mount clamp assemblies. In aspects, the stretch-mount clamp assemblies include a first connector of a first non-elastic material, a second connector of a second non-elastic material, and a tension device of an elastic material. In other aspects, the stretch-mount clamp assemblies include a first connector of a first non-elastic material, a second connector of a second non-elastic material, a mount portion of a third non-elastic material, a first tension device of a first elastic material, and a second tension device of a second elastic material.

The first and second elastic materials may be the same elastic material or may be different elastic materials. The first, second, and/or third non-elastic materials may be the same non-elastic material and/or may be different non-elastic materials. A connector (e.g., first connector, second connector) and/or a mount portion may be formed of a non-elastic material using known fabrication techniques (e.g., an injection molding process). Likewise, a tension device may be formed of an elastic material using known fabrication techniques (e.g., an injection molding process).

A connector may include one or more of a clamp member, a quick-release connector, a fastener component, a cable tie, and the like. In aspects, a first connector may be configured for connecting to a second connector in any suitable manner (e.g., mechanical fasteners, mechanical interlock, friction-fit, interference fit, snap-fit connection, and the like). The first connector may include a first fastener portion config-ured for engaging a second fastener portion of the second connector to connect the first connector to the second connector. In other aspects, the first connector may not be configured for connecting to the second connector. The first connector may be configured for connecting with itself and the second connector may be configured for connecting with itself.

The first connector and the second connector may be different connectors and/or different types of connectors. The first connector may be a first clamp member, the second connector may be a second clamp member, and the first and second clamp members may be configured for connecting together (e.g., to form a loop). In aspects, multiple stretch-mount clamp assemblies may be connected together to provide additional length, for example by connecting a first connector of a first stretch-mount clamp assembly to a second connector of a second stretch-mount clamp assem-bly. The first connector may be configured for connecting to itself (e.g., to form a loop) and the second connector may be another type of connector.

A fastener portion may include one or more of a cable tie, a clamp member, a quick-release connector, a fastener component, a mechanical fastener, a friction-fit connector, an interference fit connector, a snap-fit connection, and the like and may be configured for connecting to another object or surface or another fastener portion.

A stretch-mount clamp assembly may include one or more mechanical interlocks configured to interlock a connector to a tension device. A mechanical interlock may provide strength (e.g., in one or more of the axial or transverse directions), security, stiffness, and/or durability to a joint between the tension device and a connector. A mechanical interlock may include a mechanical interlock portion defined on or by a connector (e.g., first connector, second connec-tor). A mechanical interlock portion may include one or more ribs, bosses, keys, indentations, undercuts, or other features on a connector and/or orifices defined through the substrate material of the connector. A mechanical interlock portion may also include an overmold that interlocks with another mechanical interlock portion.

In aspects, a tension device may connect between a first connector and a second connector, between a first connector and a mount portion, and/or between a second connector and a mount portion. A known fabrication technique (e.g., an overmolding process) may be utilized to form a connection between a tension device and a connector for a stretch-mount clamp assembly described in this disclosure. In an example overmolding process, an elastic material is injected into a mold cavity into which at least a portion of a non-elastic substrate (e.g., first connector, second connector, mount portion) is positioned, and the elastic material is overmolded over at least a portion of the non-elastic substrate. The overmolding process may be a multi-material molding process (e.g., a multi-shot injection molding pro-cess) where the non-elastic substrate is molded first, the injection molding cavity of the substrate mold is altered or the substrate is moved to a second mold, and the elastic material is injected into the mold to bond to at least a portion of the substrate and form the stretch-mount clamp assembly.

In aspects, the tension device includes an overmold por-tion that forms a mechanical interlock portion. For example, the tension device may include a first overmold portion that is overmolded onto at least a portion of a connector (e.g., first connector, second connector) to form a first mechanical interlock, and the tension device may include a second overmold portion that is overmolded onto at least a portion of a mount portion to form a second mechanical interlock. As used herein, the phrase "overmolded onto" includes overmolding onto and/or into.

Through the overmolding, the tension device may be integrally formed to the first connector, the second connec-tor, and/or the mount portion. Through the overmolding process, the elastic material of the tension device may chemically bond to the non-elastic material of the connector and/or the mount portion. In aspects, the overmolding of the first overmold portion onto the at least a portion of the first retainer to form the first mechanical interlock chemically bonds the first retainer to the tension device, and the overmolding of the second overmold portion onto the at least a portion of the second retainer to form the second mechanical interlock chemically bonds the second retainer to the tension device.

A stretch-mount clamp assembly may be configured to combine one or more elongated objects (e.g., wires, har-nesses, hoses, tubes, cables, and the like) into a bundle and secure the bundle to a support structure (e.g., a mounting surface, a vehicle chassis, a vehicle panel, a vehicle frame rail, a firewall, a fender, a body panel, a bracket, or the like).

This document describes techniques and apparatuses directed to stretch-mount clamp assemblies. Aspects of the present disclosure address technical problems associated with prior clamp assemblies. In aspects, the stretch-mount clamp assemblies are configured for providing adjustable tension, the stretch-mount clamp assemblies are shortenable (length adjustable), and/or the stretch-mount clamp assem-blies may be configured for locking onto the elongated object(s) to form a bundle. In aspects, the stretch-mount clamp assemblies are configured for providing a fixing that is releasable without overstretching the fixing. In this way, the stretch-mount clamp assemblies may be reusable. In aspects, the stretch-mount clamp assemblies are configured for providing a fixing that is configured for precision ten-sioning.

The Figures illustrate aspects of the disclosed stretch-mount clamp assemblies. Optional features of one aspect described herein may be combined with other aspects to form further aspects.

FIG. 1, FIG. 1A, and FIG. 1B are schematic illustrations of an example stretch-mount clamp assembly 100. The stretch-mount clamp assembly 100 includes a first connector 110 of a first non-elastic material, a second connector 120 of a second non-elastic material, and a tension device 130 of an elastic material. The first and second non-elastic materials may be the same non-elastic material or may be different non-elastic materials. The first connector 110 and the second connector 120 may be different connectors. In aspects, the first connector 110 may be a first clamp member, the second connector 120 may be a second clamp member, and the first and second clamp members may be configured for connecting together.

In the schematic representation of FIG. 1, the first connector 110 includes a first fastener portion 118 configured for engaging a second fastener portion 128 of the second connector 120 to connect the first connector 110 to the second connector 120. In other aspects, the first connector may not be configured for connecting to the second connector. A fastener portion may include one or more of a clamp member, a quick-release connector, a fastener component, a mechanical fastener, a friction-fit connector, an interference fit connector, a snap-fit connection, a cable tie, and the like and may be configured for connecting to another object or surface or another fastener portion. The first connector 110 and the second connector 120 may be different connectors and/or different types of connectors. The first connector 110 may be a first clamp member, the second connector 120 may be a second clamp member, and the first and second clamp members may be configured for connecting together (e.g., to form a loop). The first connector 110 may be a first cable tie, the second connector 120 may be a second cable tie, and the first and second cable ties may be configured for connecting to themselves and/or together (e.g., to form a loop).

In the stretch-mount clamp assembly 100 schematically illustrated in FIG. 1, the first connector 110 includes an inner side 112 opposite an outer side 114 and further includes a first retainer 116 that extends from the inner side 112. The second connector 120 includes an outer side 122 opposite an inner side 124 and a second retainer 126 that extends from the inner side 124. The first retainer 116 may include at least one mechanical interlock (e.g., first mechanical interlock 134), and the second retainer 126 may include at least one mechanical interlock (e.g., second mechanical interlock 138). A mechanical interlock may include one or more ribs, bosses, keys, indentations, undercuts, or other features on a connector (e.g., first retainer 116 of first connector 110, second retainer 126 of second connector 120) and/or orifices defined through a substrate material of the connector. A mechanical interlock may provide strength (e.g., in one or more of the axial or transverse directions), security, stiffness, and/or durability to a joint between the tension device 130 and a connector.

The first retainer 116 may include a first upper surface 144 opposite a first lower surface 146, and the first mechanical interlock 134 may include at least one first interlock orifice (e.g., first interlock orifice 148) defined between the first upper surface 144 and the first lower surface 146. In such a configuration, the first interlock orifice 148 extends through the first retainer 116. The second retainer 126 may include a second upper surface 154 opposite a second lower surface 156, and the second mechanical interlock 138 may include at least one second interlock orifice (e.g., second interlock orifice 158) defined between the second upper surface 154 and the second lower surface 156. In such a configuration, the second interlock orifice 158 extends through the second retainer 126.

The tension device 130 connects between the first connector 110 and the second connector 120. In aspects, the tension device 130 connects the inner side 112 of the first connector 110 to the inner side 124 of the second connector 120. A known fabrication technique (e.g., an overmolding process) may be utilized to form the connection between the tension device 130 and a connector for a stretch-mount clamp assembly described in this disclosure. In an example overmolding process, an elastic material is injected into a mold cavity into which at least a portion of a non-elastic substrate (e.g., first connector 110, second connector 120) is positioned and the elastic material is overmolded over at least a portion of the non-elastic substrate. The overmolding process may be a multi-material molding process (e.g., a multi-shot injection molding process) where the non-elastic substrate is molded first, the injection molding cavity of the substrate mold is altered or the substrate is moved to a second mold, and the elastic material is injected into the mold to bond to at least a portion of the substrate and form the stretch-mount clamp assembly.

In aspects, the tension device 130 includes an overmold portion that may interlock with at least a portion of a retainer to form a mechanical interlock. For example, the tension device 130 may include a first overmold portion 132 that is overmolded onto at least a portion of the first retainer 116 to form the first mechanical interlock 134, and the tension device 130 may include a second overmold portion 136 that is overmolded onto at least a portion of the second retainer 126 to form the second mechanical interlock 138. Through the overmolding, the tension device 130 may be integrally formed to the first connector 110 and/or the second connector 120. The elastic material of the tension device 130 may extend through the first interlock orifice 148 and/or through the second interlock orifice 158, illustrated in FIG. 1A and FIG. 1B. In such a configuration, the overmold (elastic) material fills in the orifices. In another example, the retainer(s) include at least one rib, boss, key, indentation, or undercut, and the elastic material of the tension device 130 extends around at least one or more of at least one rib, boss, key, indentation, or undercut to provide the mechanical interlock.

Through the overmolding process, the elastic material of the tension device 130 may chemically bond to the non-elastic material of the connector. In aspects, the overmolding of the first overmold portion 132 onto the at least a portion of the first retainer 116 to form the first mechanical interlock 134 chemically bonds the first overmold portion 132 to the first retainer 116, and the overmolding of the second overmold portion 136 onto the at least a portion of the second retainer 126 to form the second mechanical interlock 138 chemically bonds the second overmold portion 136 to the second retainer 126.

FIG. 2, FIG. 3A, FIG. 3B, and FIG. 4 are illustrations of a stretch-mount clamp assembly 200. In this aspect, the stretch-mount clamp assembly 200 is a stretch band clamp (e.g., a stretch band P-clamp). The stretch-mount clamp assembly 200 is similar to the stretch-mount clamp assembly 100 illustrated in FIGS. 1, 1A, and 1B and described above, except as detailed below. Thus, the stretch-mount clamp assembly 200 includes a first connector 210 of a first non-elastic material, a second connector 220 of a second non-elastic material, and a tension device 230 of an elastic material. The first and second non-elastic materials may be the same non-elastic material or may be different non-elastic materials. The stretch-mount clamp assembly 200 further includes a first connector inner side 212 opposite a first connector outer side, a first retainer 214 that extends from the inner side 212, a second connector outer side opposite a second connector inner side 222, a second retainer 224 that extends from the inner side 222, a first mechanical interlock 234, a second mechanical interlock 238, a first retainer first upper surface opposite a first retainer first lower surface, at least one first interlock orifice defined between the first upper surface and the first lower surface and extending through the first retainer 214, a second retainer second upper surface opposite a second retainer second lower surface, and at least one second interlock orifice defined between the second retainer second upper surface and the second retainer second lower surface and extending through the second retainer 224.

The tension device 230 connects between the first connector 210 and the second connector 220. In aspects, the tension device 230 includes a first overmold portion 232 that is overmolded onto at least a portion of the first retainer 214 and a second overmold portion 236 that is overmolded onto at least a portion of the second retainer 224. Through the overmolding, the tension device 230 is integrally formed to the first connector 210 and/or the second connector 220.

The first connector 210 and the second connector 220 may be a suitable connector (e.g., a clamp member, a quick-release connector, a fastener component, a mechanical fastener, a friction-fit connector, an interference fit connector, a snap-fit connection, and the like). The connectors 210 and 220 may be mating connectors and/or may be configured for connecting to another object, another surface, and the like. In the aspect illustrated in FIG. 2, FIG. 3A, and FIG. 3B, the first connector 210 and the second connector 220 are mating connectors, configured for mating engagement.

The stretch-mount clamp assembly 200 includes a lock mechanism 260 configured for locking the assembly 200 around at least one elongated object to form a bundle. The lock mechanism 260 may be a slotted opening in the first connector 210 configured to connect with a tongue member 221 extending from the second connector 220. The lock mechanism 260 includes a slotted opening 211 defined in the first connector 210 and a tongue member 221 extending from the second connector 220. The tongue member 221 and the slotted opening 211 may be arcuately shaped. The tongue member 221 is configured for receipt into the slotted opening 211, which is defined by the first clamp member. The slotted opening 211 includes a pawl mechanism including a pawl (e.g., a pawl illustrated in FIGS. 9, 10A, and 10B) configured for engaging one or more serrations 223 defined on the tongue member 221 to allow unidirectional movement of the tongue member 221 through the slotted opening 211 in a first direction and resist movement of the tongue member 221 in an opposite direction. The serrations 223 may extend along the length of the tongue member 221 and across the width of the tongue member 221. The serrations may extend from the tongue member and/or may be defined in the tongue member. The pawl located in the slotted opening 211 may include teeth disposed within the slotted opening 211, and the serrations 223 may be configured to engage the teeth on the pawl when the tongue member 221 is inserted into the slotted opening 211.

Via the lock mechanism 260, the connection between the first connector 210 and the second connector 220 is adjustable. For example, adjusting the a portion of the tongue member 221 advanced through the slotted opening 211 changes the diameter of the bundle formed. The adjustability of the connection and/or elastic properties of the tension device 230 may enable a user to vary an amount of tension applied to the elongated objects retained by the stretch-mount clamp assembly 200. In this way, the stretch-mount clamp assembly 200 may provide adjustable tension.

The lock mechanism 260 may be releasable via a release feature (e.g., release feature 1002 illustrated in FIGS. 10A and 10B) defined in at least one of the pawl or the tongue member 221, configured to enable a user to insert a finger, fingernail, or tool (e.g., screwdriver) in between the pawl and/or the tongue member 221 to release the engagement of the pawl teeth from the serrations 223 and permit the movement of the tongue member 221 out of the slotted opening 211 in a second direction opposite to the first direction. The lock mechanism 260 enables the stretch-mount clamp assembly 200 to be adjustable to secure a range of various bundle diameters. Each succeeding engagement of the pawl teeth to the serrations 223 reduces a circumferential diameter being formed by the stretch-mount clamp assembly 200. As a result, the stretch-mount clamp assembly 200 is adjustable to various bundle diameters.

Figures 2, 3A, 3B:
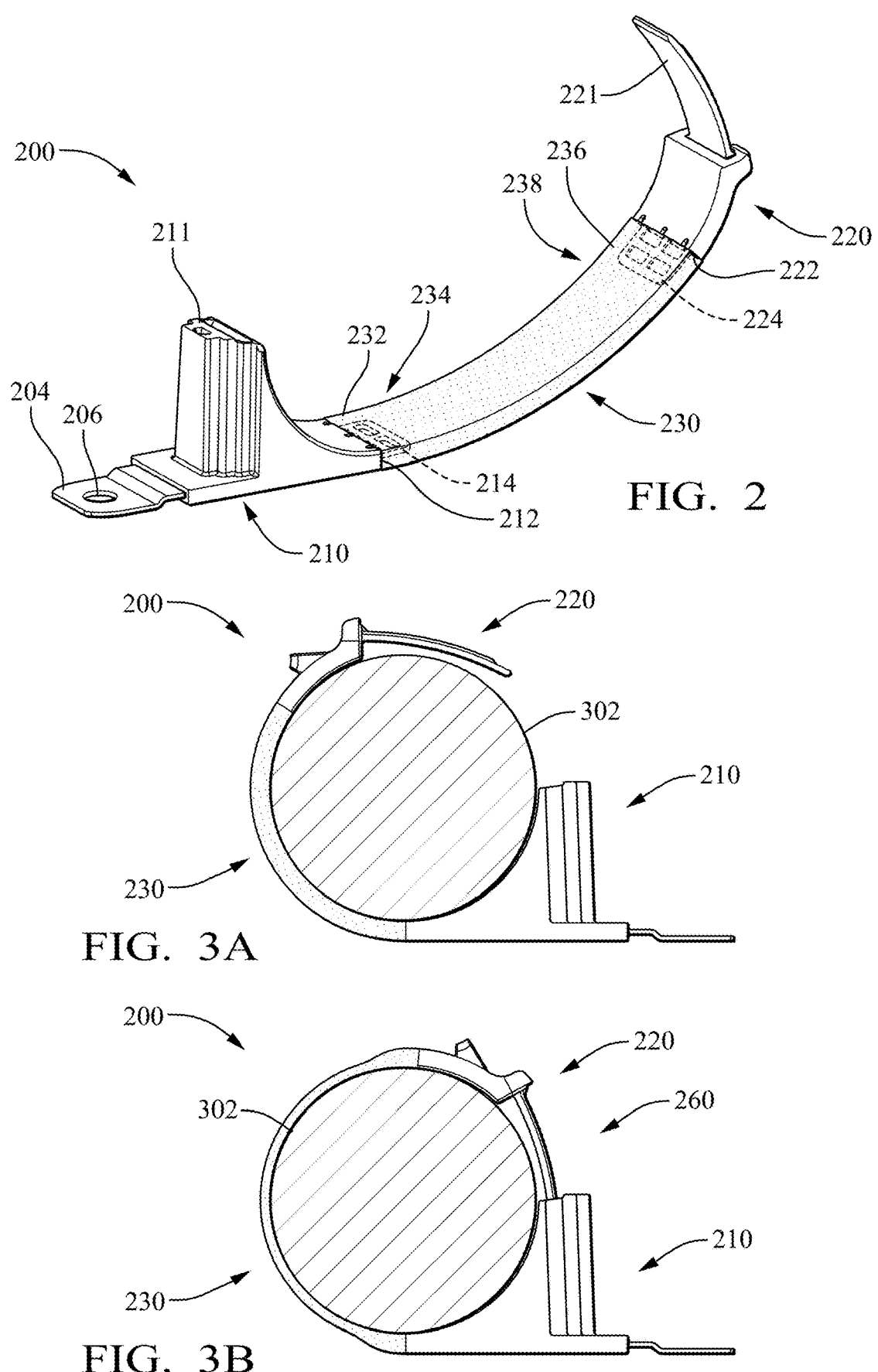
FIG. 2 is a perspective view of a stretch-mount clamp assembly.
FIG. 3A is a first side environmental view of the stretch-mount clamp assembly of FIG. 2.
FIG. 3B is a second side environmental view of the stretch-mount clamp assembly of FIG. 2.

The tension device 230 of the stretch-mount clamp assembly 200 permits the stretch-mount clamp assembly 200 to be further adjustable to various bundle diameters. FIGS. 3A and 3B illustrate the tension device 230 stretching from a first length (in FIG. 3A) to a second length (in FIG. 3B) to secure elongated items into a bundle 302. In FIG. 3A, the elongated items have a combined diameter that is larger than an at-rest diameter of the stretch-mount clamp assembly 200. In FIG. 3B, the tension device 230 has stretched to enable the second connector 220 to engage the first connector 210. The adjustability of the connection and/or the elastic properties of the tension device 230 may enable a user to vary the amount of tension applied to the elongated object(s) retained by the stretch-mount clamp assembly 200. In this way, the stretch-mount clamp assembly 200 may provide adjustable tension.

The stretch-mount clamp assembly 200 may further include a mounting element 204 configured for facilitating mounting of the stretch-mount clamp assembly 200 to a support structure, for example, via a threaded fastener (e.g., illustrated in FIG. 8) that extends through an orifice 206 defined in the mounting element 204 and into a threaded hole in the support structure. The mounting element 204 may be integrally formed with the connector (e.g., first connector 210). For example, the mounting element 204 may be overmolded with the stretch-mount clamp assembly 200. The mounting element 204 may be fabricated of any suitably resilient material, including non-elastic materials (e.g., metal).

Figure 4:
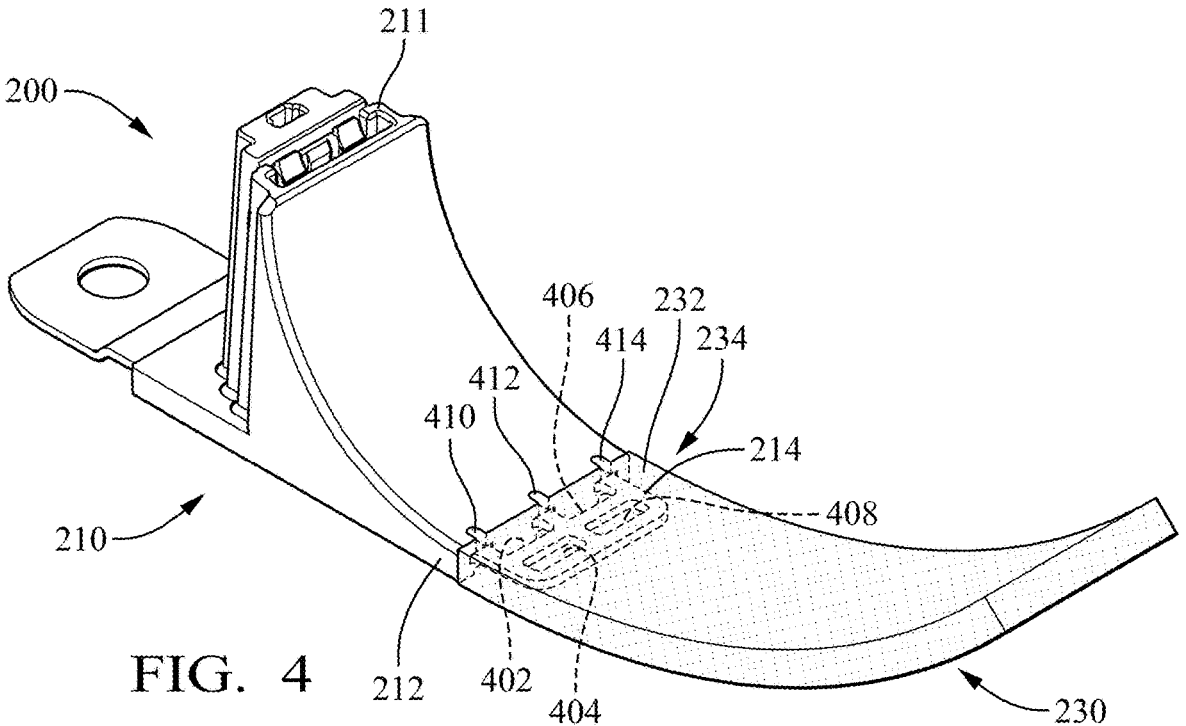
FIG. 4 is a partial, perspective view of the stretch-mount clamp assembly of FIG. 2.

The retainers (e.g., first retainer 214, second retainer 224) include at least one mechanical interlock (e.g., first mechanical interlock 234, second mechanical interlock 238). A mechanical interlock may include one or more ribs, bosses, keys, indentations, undercuts, or other features on a connector and/or orifices defined through a substrate material of the connector. For example, as illustrated in FIG. 4, the first connector 210 includes the first mechanical interlock 234 formed by the overmolding of the material of the tension device 230 onto the first connector 210 and/or the first retainer 214. The first retainer 214 includes interlock orifices (e.g., interlock orifice 402, interlock orifice 404, interlock orifice 406, interlock orifice 408), and the first connector 210 further includes interlock channels (e.g., interlock channel 410, interlock channel 412, interlock channel 414).

Figure 5:
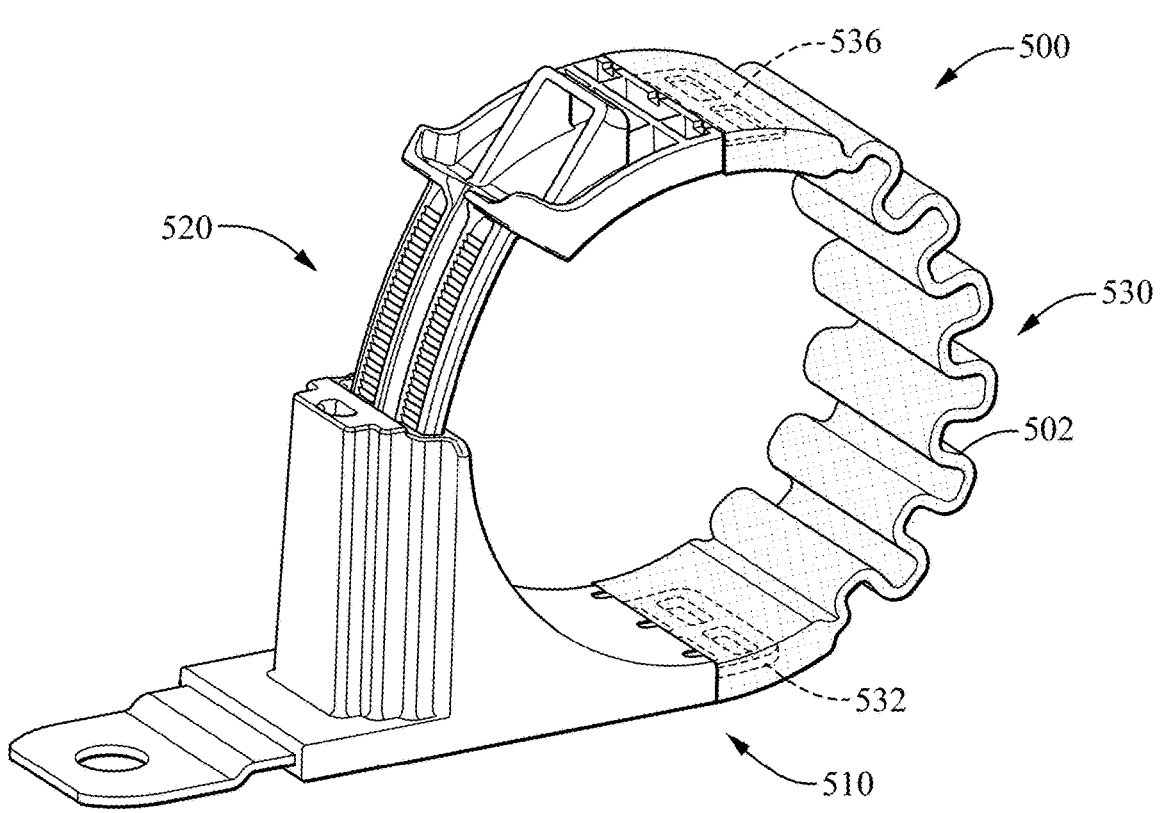
FIG. 5 is a perspective view of a stretch-mount clamp assembly.

FIG. 5 illustrates another aspect of a stretch-mount clamp assembly 500. In this aspect, the stretch-mount clamp assembly 500 is a stretch band clamp (e.g., a stretch band P-clamp). The stretch-mount clamp assembly 500 is similar to the stretch-mount clamp assembly 100 illustrated in FIG. 1 and described above, except as detailed below. Thus, the stretch-mount clamp assembly 500 includes a first connector 510 of a first non-elastic material, a second connector 520 of a second non-elastic material, a tension device 530 of an elastic material, a first connector inner side opposite a first connector outer side, a first retainer that extends from the first connector inner side, a second connector inner side opposite a second connector outer side, a second retainer that extends from the second connector inner side, a first retainer first mechanical interlock, a second retainer second mechanical interlock, a first retainer first upper surface opposite a first retainer first lower surface, at least one first interlock orifice defined between the first upper surface and the first lower surface and extending through the first retainer, a second retainer second upper surface opposite a second retainer second lower surface, and at least one second interlock orifice defined between the second retainer second upper surface and the second retainer second lower surface and extending through the second retainer.

The tension device 530 connects between the first connector 510 and the second connector 520. In aspects, the tension device 530 includes a first overmold portion 532 that is overmolded onto at least a portion of the first retainer and a second overmold portion 536 that is overmolded onto at least a portion of the second retainer. The tension device 530 may include a variable curve portion 502 between the first overmold portion 532 and the second overmold portion 536 that is elastically extensible in a longitudinal direction of the tension device 530. In aspects, the variable curve portion 502 follows a generally sinusoidal curve. The variable curve portion 502 of the tension device 530 further permits the stretch-mount clamp assembly 500 to be further adjustable to various bundle diameters, enabling the stretch-mount clamp assembly 500 to further stretch to secure elongated items into a bundle while maintaining a compact shape.

Figures 6, 7, 8:
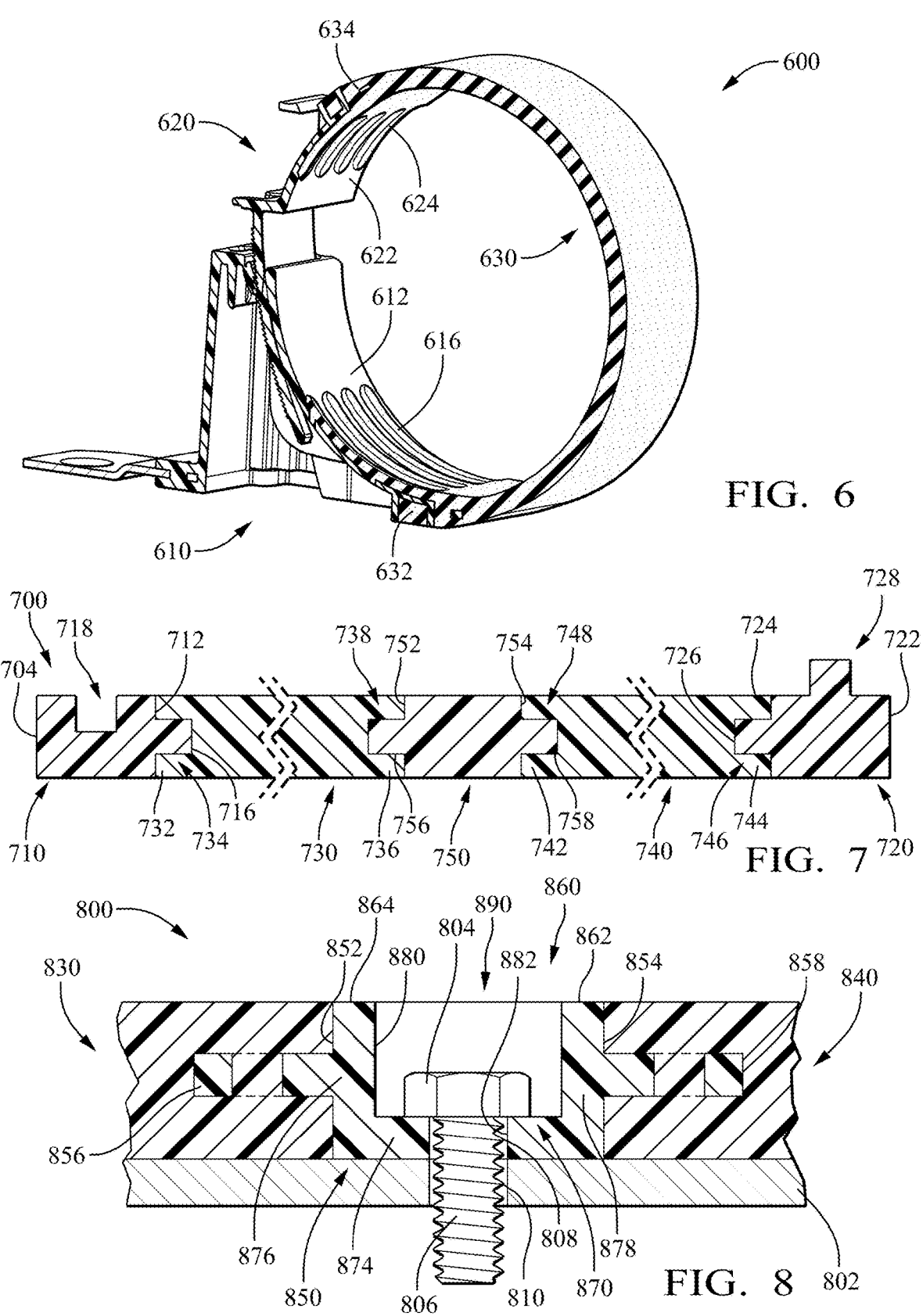
FIG. 6 is a perspective view of a stretch-mount clamp assembly.
FIG. 7 is a schematic representation of a stretch-mount clamp assembly.
FIG. 8 is a partial schematic representation of a stretch-mount clamp assembly.

FIG. 6 illustrates another stretch-mount clamp assembly 600. In this aspect, the stretch-mount clamp assembly 600 is a stretch band clamp (e.g., a stretch band P-clamp). The stretch-mount clamp assembly 600 is similar to the stretch-mount clamp assembly 100 illustrated in FIG. 1 and described above, except as detailed below. Thus, the stretch-mount clamp assembly 600 includes a first connector 610 of a first non-elastic material, a second connector 620 of a second non-elastic material, a tension device 630 of an elastic material, a first connector inner side opposite a first connector outer side, a first retainer that extends from the first connector inner side, a second connector inner side opposite a second connector outer side, a second retainer that extends from the second connector inner side, a first retainer first mechanical interlock, a second retainer second mechanical interlock, a first retainer first upper surface opposite a first retainer first lower surface, at least one first interlock orifice defined between the first upper surface and the first lower surface and extending through the first retainer, a second retainer second upper surface opposite a second retainer second lower surface, and at least one second interlock orifice defined between the second retainer second upper surface and the second retainer second lower surface and extending through the second retainer.

The first connector 610 includes an arcuately shaped profile 612 that is shaped and/or dimensioned to receive a bundle, and the second connector 620 includes an arcuately shaped profile 622 that is shaped and/or dimensioned to receive the bundle. The tension device 630 connects between the first connector 610 and the second connector 620. The tension device 630 may include a first overmold portion 632 that is overmolded onto at least a portion of the first retainer and a second overmold portion 634 that is overmolded onto at least a portion of the second retainer. Through the overmolding, the tension device 630 is integrally formed to the first connector 610 and/or the second connector 620. The elastic material of the tension device 630 may extend onto and into the arcuately shaped profile 612 and/or the arcuately shaped profile 622 to provide ridges (e.g., ridge 616, ridge 624) projecting from the respective arcuately shaped profiles. The ridges may be configured to aid in securing a bundle (not illustrated) within the stretch-mount clamp assembly 600 and help prevent unwanted rotation of the bundle during vibration or other movement of the stretch-mount clamp assembly 600.

FIG. 7 is a schematic illustration of an aspect of a stretch-mount clamp assembly 700. The stretch-mount clamp assembly 700 is similar to the stretch-mount clamp assembly 100 illustrated in FIG. 1 and described above, except as detailed below. Thus, the stretch-mount clamp assembly 700 includes a first connector 710 of a first non-elastic material, a second connector 720 of a second non-elastic material, and a tension device (e.g., tension device 730) of a first elastic material. The stretch-mount clamp assembly 700 further includes a second tension device 740 of a second elastic material, and a mount portion 750 including a non-elastic material. The first and second elastic materials may be the same elastic material. The first, second, and/or third non-elastic materials may be the same non-elastic material. The first tension device 730 connects between the first connector 710 and the mount portion 750. The second tension device 740 connects between the second connector 720 and the mount portion 750.

In the schematic representation of FIG. 7, the first connector 710 includes a first fastener portion 718 configured for engaging a second fastener portion 728 of the second connector 720 to connect the first connector 710 to the second connector 720. In other aspects, the first connector 710 may not be configured for connecting to the second connector 720. A fastener portion may include one or more of a clamp member, a quick-release connector, a fastener component, a mechanical fastener, a friction-fit connector, an interference fit connector, a snap-fit connection, a cable tie, and the like and may be configured for connecting to another object or surface or another fastener portion. The first connector 710 and the second connector 720 may be different connectors and/or different types of connectors. In aspects, the first connector 710 may be a first clamp member, the second connector 720 may be a second clamp member, and the first and second clamp members may be configured for connecting together (e.g., to form a loop).

The first connector 710 includes an inner side 712 opposite an outer side 704, and the second connector 720 includes an inner side 724 opposite an outer side 722. A first retainer 716 extends from the inner side 712, and a second retainer 726 extends from the inner side 724. The retainer (e.g., first retainer 716, second retainer 726) is configured for retaining the connector on the tension device. The mount portion 750 includes a first end 752 opposite a second end 754. A first center retainer 756 extends from the first end 752 of the mount portion 750, and a second center retainer 758 extends from the second end 754 of the mount portion 750. The retainer (e.g., first center retainer 756, second center retainer 758) is configured for retaining the mount portion 750 on the tension device.

The first retainer 716, the second retainer 726, the first center retainer 756, and/or the second center retainer 758 may include or form part of at least one mechanical interlock, for example, as illustrated with respect to the stretch-mount clamp assembly 100 in FIGS. 1A and 1B. A mechanical interlock may provide strength (e.g., in one or more of the axial or transverse directions), security, stiffness, and/or durability to a joint between the tension device and a connector. A mechanical interlock may include one or more ribs, bosses, keys, indentations, undercuts, or other features on a connector (e.g., first retainer 716, second retainer 726, first center retainer 756, second center retainer 758) and/or orifices defined through a substrate material of the connector. For example, a retainer may include a first upper surface opposite a first lower surface, and a mechanical interlock may include at least one interlock orifice defined between the first upper surface and the first lower surface. In such a configuration, the first interlock orifice extends through the retainer. In another example, the retainer includes at least one rib, boss, key, indentation, or undercut, and the elastic material of the tension device extends around at least one or more of at least one rib, boss, key, indentation, or undercut to provide the mechanical interlock.

The first tension device 730 connects the inner side 712 of the first connector 710 to the first end 752 of the mount portion 750. The first tension device 730 includes a first overmold portion 732 that is overmolded onto at least a portion of the first retainer 716 to form a first mechanical interlock 734 and a second overmold portion 736 that is overmolded onto at least a portion of the first center retainer 756 to form a second mechanical interlock 738. The second tension device 740 connects the inner side 724 of the second connector 720 to the second end 754 of the mount portion 750. The second tension device 740 includes a third overmold portion 744 that is overmolded onto at least a portion of the second retainer 726 to form a third mechanical interlock 746 and a fourth overmold portion 742 that is overmolded onto at least a portion of the second center retainer 758 to form a fourth mechanical interlock 748. In this way, the tension device 730 may be integrally formed to the first connector 710 and/or the mount portion 750, and/or the tension device 740 may be integrally formed to the second connector 720 and/or the mount portion 750, increasing the strength of the stretch-mount clamp assembly 700.

The overmold portion may interlock with at least a portion of the retainer to form the mechanical interlock. In this way, the tension device 730 is mechanically interlocked to the first connector 710 and/or the mount portion 750 and the tension device 740 is mechanically interlocked to the second connector 720 and/or the mount portion 750, increasing the strength of the stretch-mount clamp assembly 700. In aspects, overmolding of an overmold portion onto at least a portion of a retainer to form a mechanical interlock chemically bonds the overmold portion to the retainer.

The first connector 710 and the second connector 720 may be a suitable connector (e.g., a clamp member, a quick-release connector, a fastener component, a mechanical fastener, a friction-fit connector, an interference fit connector, a snap-fit connection, and the like). The connectors 710 and 720 may be mating connectors and/or may be configured for connecting to another object, another surface, and the like. In the aspect illustrated in FIG. 7, the first connector 710 and the second connector 720 are mating connectors, configured for mating engagement.

The stretch-mount clamp assembly 700 may include a lock mechanism configured for locking the stretch-mount clamp assembly 700 around at least one elongated object to form a bundle. In aspects, the lock mechanism may be a slotted opening in the first connector 710 configured to connect with a tongue member extending from the second connector 720, as described below with respect to FIG. 9, FIG. 10A, and FIG. 10B.

FIG. 8 is a partial schematic illustration of a further stretch-mount clamp assembly 800. The stretch-mount clamp assembly 800 is similar to the stretch-mount clamp assembly 700 illustrated in FIG. 7 and described above, except as detailed below. Thus, the stretch-mount clamp assembly 800 includes a first connector of a first non-elastic material, a second connector of a second non-elastic material, a first tension device 830 of a first elastic material, a second tension device 840 of a second elastic material, and a mount 850 including a non-elastic material. The first tension device 830 connects between the first connector and the mount 850 and the second tension device 840 connects between the second connector and the mount 850, for example, as described with respect to the stretch-mount clamp assembly 700 described above. The mount 850 includes a first end 852 opposite a second end 854, a first center retainer 856 extends from the first end 852 of the mount 850, and a second center retainer 858 extends from the second end 854 of the mount 850. The retainers (e.g., first center retainer 856, second center retainer 858) are configured for retaining the mount 850 on the tension device. The retainers may include a mechanical interlock, as described above.

The mount 850 may include a saddle section 860, a mount section 870, and an interconnect section 890. In aspects, the saddle section 860 is configured to receive a bundle and may include one or more supports (e.g., support 862, support 864) configured for contacting and supporting the bundle. The saddle section 860 may be formed of one or more of a non-elastic material and/or an elastic material. The mount section 870 may be formed of a non-elastic material.

The mount section 870 is configured to mount the mount 850 to a support structure 802. The mount section 870 may include a frame having a base 874, a first upright 876, and a second upright 878. The first upright 876 and the second upright 878 may be generally parallel to one another and generally perpendicular to the base 874. An aperture 882 may be defined through the base 874. In the aspect illustrated in FIG. 8, a counterbore 880 is defined in the mount section 870. The counterbore 880 terminates at the base 874 of the mount section 870, connecting the aperture 882 with the counterbore 880. In aspects, the aperture 882 is defined by a metal bushing. The counterbore 880 may be sized to receive a head 804 of a fastener therein, with a shaft of the fastener extending through the aperture 882. For example, a threaded shaft 808 of a bolt 806 may extend through the aperture 882 and into a threaded hole 810 defined in the support structure 802.

The interconnect section 890 is configured to permit the mount 850 to flex (e.g., the first upright 876 to flex relative to the second upright 878). In the aspect illustrated in FIG. 8, the interconnect section 890 connects the first upright 876 relative to the second upright 878. The interconnect section 890 may be formed of a third elastic material, which may be the same elastic material as the first and/or second elastic materials.

Figure 9:
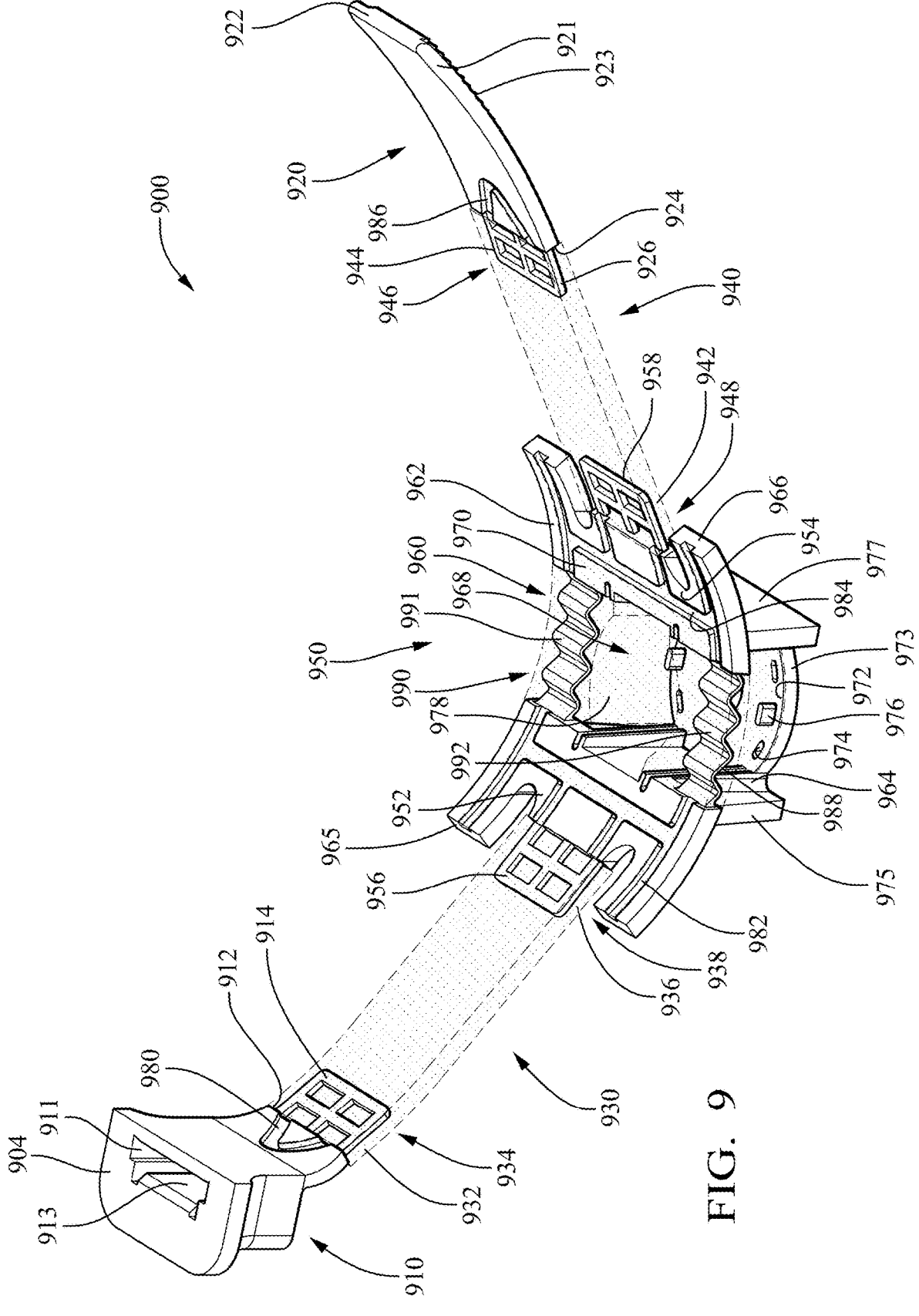
FIG. 9 is a perspective view of a stretch-mount clamp assembly.
Figures 10A, 10B:
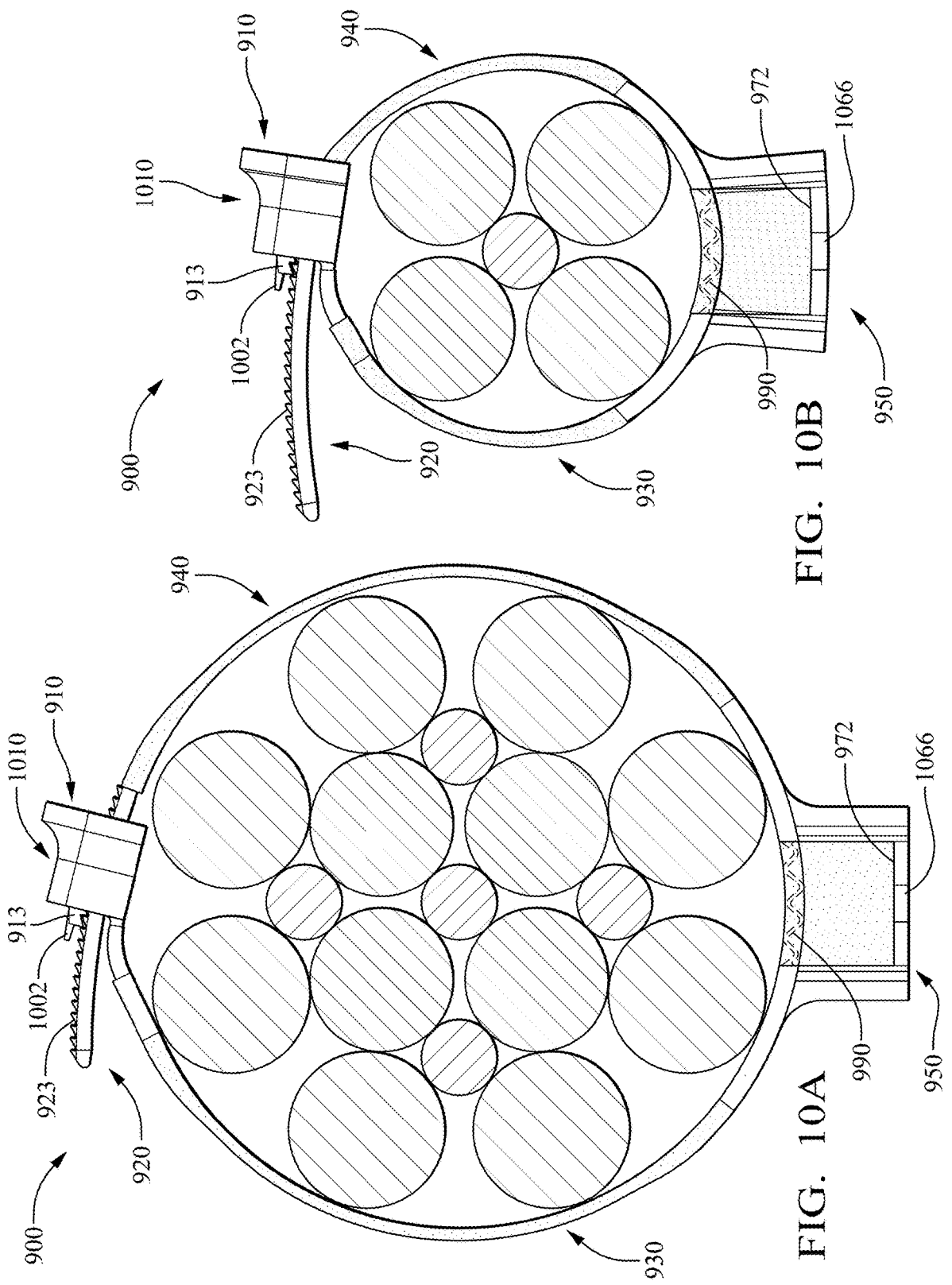
FIG. 10A is a first side environmental view of the stretch-mount clamp assembly of FIG. 9.
FIG. 10B is a second side environmental view of the stretch-mount clamp assembly of FIG. 9.

FIG. 9, FIG. 10A, and FIG. 10B are illustrations of another stretch-mount clamp assembly 900. In this aspect, the stretch-mount clamp assembly 900 is a hybrid clamp tie. The stretch-mount clamp assembly 900 is similar to the stretch-mount clamp assembly 800 illustrated in FIG. 8 and described above, except as detailed below. Thus, the stretch-mount clamp assembly 900 includes a first connector 910 of a first non-elastic material, a second connector 920 of a second non-elastic material, a first tension device 930 of a first elastic material, a second tension device 940 of a second elastic material, and a mount 950 of a third non-elastic material. Two or more of the first, second, and third non-elastic materials may be the same non-elastic material. The first and second elastic materials may be the same elastic material. The first tension device 930 connects between the first connector 910 and the mount 950. The second tension device 940 connects between the second connector 920 and the mount 950. The first connector 910 is configured for connecting with the second connector 920 to form a loop, as illustrated in FIG. 10A and FIG. 10B.

The first connector 910 includes an inner side 912 opposite an outer side 904, and the second connector 920 includes an inner side 924 opposite an outer side 922. A first retainer 914 extends from the inner side 912, and a second retainer 926 extends from the inner side 924. The retainer is configured for retaining the connector on the tension device, as described above, for example with respect to FIGS. 1, 1A, and 1B. The mount 950 includes a first end 952 opposite a second end 954. A first center retainer 956 extends from the first end 952 of the mount 950, and a second center retainer 958 extends from the second end 954 of the mount 950. The center retainers 956 and 958 are configured for retaining the mount 950 on the tension device, for example similarly to how a retainer connects with a connector as described with respect to FIGS. 1, 1A, and 1B. The first retainer 914, the second retainer 926, the first center retainer 956, and/or the second center retainer 958 may include or form part of at least one mechanical interlock, for example, as illustrated with respect to the stretch-mount clamp assembly 100 in FIGS. 1, 1A, and 1B.

The first tension device 930 connects the inner side 912 of the first connector 910 to the first end 952 of the mount 950. The first tension device 930 includes a first overmold portion 932 that is overmolded onto at least a portion of the first retainer 914 to form a first mechanical interlock 934. The first tension device 930 further includes a second overmold portion 936 that is overmolded onto at least a portion of the first center retainer 956 to form a second mechanical interlock 938. The second tension device 940 connects the inner side 924 of the second connector 920 to the second end 954 of the mount 950. The second tension device 940 includes a third overmold portion 944 that is overmolded onto at least a portion of the second retainer 926 to form a third mechanical interlock 946 and a fourth overmold portion 942 that is overmolded onto at least a portion of the second center retainer 958 to form a fourth mechanical interlock 948. In this way, the tension device 930 may be integrally formed to the first connector 910 and/or the mount 950, and/or the second tension device 940 may be integrally formed to the second connector 920 and/or the mount 950, increasing the strength of the stretch-mount clamp assembly 900. The tension device (e.g., tension device 930, second tension device 940) of the stretch-mount clamp assembly 900 permits the stretch-mount clamp assembly 900 to be further adjustable to various bundle diameters. A tension device may be configured to stretch from a first length to a second length to secure elongated items into a bundle, which is illustrated in FIGS. 10A and 10B. In FIG. 10A, the elongated items have a combined diameter that is larger than an at-rest diameter of the stretch-mount clamp assembly 900. In FIG. 10B, the tension device 930 has stretched to enable the second connector 920 to engage the first connector 910. The adjustability of the connection and/or elastic properties of the tension device 930 may enable a user to vary an amount of tension applied to the elongated object(s) retained by the stretch-mount clamp assembly 900. In this way, the stretch-mount clamp assembly 900 may provide adjustable tension.

The overmold portion may interlock with at least a portion of the retainer to form the mechanical interlock. In this way, the tension device 930 is mechanically interlocked to the first connector 910 and/or the mount 950 and the second tension device 940 is mechanically interlocked to the second connector 920 and/or the mount 950, increasing the strength of the stretch-mount clamp assembly 900. In aspects, overmolding of an overmold portion onto at least a portion of a retainer to form a mechanical interlock chemically bonds the overmold portion to the retainer. The first connector 910, second connector 920, and/or mount 950 may include one or more channels, ribs, bosses, keys, indentations, undercuts, and the like (e.g., channel 980, channel 982, channel 984, channel 986) defined therein for receiving overmolded elastic material of the first tension device 930 and/or the second tension device 940 to form a mechanical interlock.

The stretch-mount clamp assembly 900 includes a lock mechanism configured for locking the assembly 900 around the elongated object(s) to form a bundle. The lock mechanism may be a slotted opening in the first connector 910, which is configured to connect with a tongue member extending from the second connector 920, as described above with respect to FIG. 2. In the stretch-mount clamp assembly 900, the lock mechanism 1010 includes a slotted opening 911 defined in the first connector 910 and a tongue member 921 extending from the second connector 920. The tongue member 921 and the slotted opening 911 may be arcuately shaped. The tongue member 921 is configured for receipt into the slotted opening 911. The slotted opening 911 includes a pawl 913 configured for engaging one or more serrations 923 defined on the tongue member 921 to allow unidirectional movement of the tongue member 921 through the slotted opening 911 in a first direction and resist movement of the tongue member 921 in an opposite direction. Via the lock mechanism, the connection between the first connector 910 and the second connector 920 is adjustable. For example, adjusting a portion of the tongue member 921 advanced through the slotted opening 911 changes a diameter of the bundle formed. The adjustability of the connection and/or the elastic properties of the first tension device 930 and/or the second tension device 940 may enable a user to vary the amount of tension applied to the elongated objects retained by the stretch-mount clamp assembly 900. In this way, the stretch-mount clamp assembly 900 may provide adjustable tension. The lock mechanism enables the stretch-mount clamp assembly 900 to be adjustable to secure a range of various bundle diameters. Each succeeding engagement of teeth on the pawl 913 to the serrations 923 reduces a circumferential diameter being formed by the stretch-mount clamp assembly 900. As a result, the stretch-mount clamp assembly 900 is adjustable to various bundle diameters.

The serrations 923 may extend along the length of the tongue member 921 and across the width of the tongue member 921. The serrations may extend from the tongue member and/or may be defined in the tongue member. The pawl 913 located in the slotted opening 911 may include teeth disposed within the slotted opening 911, and the serrations 923 may be configured to engage the teeth on the pawl 913 when the tongue member 921 is inserted into the slotted opening 911.

The lock mechanism may be releasable via a release feature 1002 defined in at least one of the pawl 913 or tongue member 921, which enables a user to insert a finger, fingernail, or tool (e.g., screwdriver) in between the pawl 913 and/or tongue member 921 to release the engagement of the teeth from the serrations 923 and permit movement of the tongue member 921 out of the slotted opening 911 in a second direction opposite to the first direction. For example, in FIGS. 10A and 10B, the pawl 913 includes a release feature 1002. The release feature 1002 may be defined by a flange extending from a top side of the pawl 913. The flange may be spaced apart from a front side of the pawl 913 to define a recess for receiving a tip of a user's finger, a tip of a release tool (e.g., an industry-standard flat-blade screwdriver), or another object usable to release the pawl 913 from engagement with the serrations 923 of the tongue member 921. In the configuration illustrated in FIGS. 10A and 10B, the top side may be generally flush with or recessed below a top side of a locking head and the pawl 913 is at least substantially contained within the locking head. In other aspects, one or more of the pawl or release feature may extend beyond the top side of the locking head, such that the pawl and/or locking head protrudes longitudinally out of a second channel.

The mount 950 may include a saddle section 962 configured for supporting at least one elongated article (e.g., a bundle of elongated articles). The saddle section 962 may include one or more support rails (e.g., support rail 965, support rail 966) configured for contacting and supporting the bundle. The saddle section 962 may be formed of one or more of a non-elastic material or an elastic material. The saddle section 962 may include a mounting surface 970 configured to support a bundle of wires, cables, or other elongated objects. The mounting surface 970 may be planar, curved, or another shape. In the aspect illustrated in FIG. 8, the mounting surface 970 is curved, having an arcuately shaped profile. The saddle section 962 may be H-shaped, having a bridge section 960 connecting two laterally spaced and substantially parallel support rails (e.g., support rail 965, support rail 966) to support the mounting surface 970 of the saddle section 962 for abutting the bundle. In aspects, the support rails are standoff saddles.

The mount 950 may further include a mount section 964 configured for facilitating mounting of the stretch-mount clamp assembly 900 to a support structure, for example, via a threaded fastener (not illustrated) that extends through a counterbore 968 defined in the mount section 964 and into a threaded hole (not illustrated) in the support structure (not illustrated). The mount section 964 may be formed of a non-elastic material. The mount section 964 may include a frame having a base 973, a first upright 975, and a second upright 977. The base 973 may further include one or more one or more channels, ribs, bosses, keys, indentations, undercuts, and the like (e.g., orifice 974, rib 976) defined therein and/or thereon for receiving overmolded elastic material of the first tension device 930 and/or the second tension device 940 to form a mechanical interlock. The orifice 974 may be a through hole. The first upright 975 and the second upright 977 may be generally parallel to one another and generally perpendicular to the base 973. An aperture 988 may be defined through the base 973.

The mount section 964 may be integrally formed with the connector (e.g., first connector 910, second connector 920). For example, the mount section 964 may be overmolded with the stretch-mount clamp assembly 900. The mount section 964 may be fabricated of any suitably resilient material, including non-elastic materials (e.g., metal).

In the aspect illustrated in FIG. 9, the counterbore 968 is defined in the mount section 964 (e.g., in the mounting surface 970). The counterbore 968 may extend into the mount section 964 and terminate at the base 973 of the mount section 964, connecting the aperture 988 with a counterbore 978. In aspects, the aperture 988 is defined by a metal bushing. The counterbore 978 may be sized to receive a head of a fastener therein, with a shaft of the fastener extending through the aperture 988. For example, a threaded shaft of a bolt may extend through the aperture 988 and into a threaded hole defined in the support structure, as illustrated in FIG. 8. The counterbore 968 may be sized to allow a user of a socket and ratchet to place a nut or other fastener therein, the nut configured for engaging a threaded post (e.g., a bolt) extending from the support structure. The counterbore 968 may include a lower surface 972 that defines an aperture 1066 therethrough, the aperture 1066 configured for receiving the threaded post therethrough.

In aspects, the counterbore 968 may include one or more hinged pawl mechanisms that are configured for engaging threads on the threaded post to mount the mount 950 to the support structure. In aspects, a threaded fastener (e.g., bolt) may be inserted into the counterbore 968, through the aperture, and into engagement with a threaded hole defined in the support structure, thereby attaching the mount 950 to the support structure.

The mount 950 may include an interconnect section 990 configured to permit the mount 950 to flex (e.g., the first upright 975 to flex relative to the second upright 977). In the aspect illustrated in FIG. 9, the interconnect section 990 connects the first upright 975 relative to the second upright 977. The interconnect section 990 may be formed of an elastic material and/or a non-elastic material. The interconnect section 990 may include a variable curve portion (e.g., variable curve portion 991, variable curve portion 992) that extends between the first upright 975 and the second upright 977 and is elastically extensible in a longitudinal direction, as illustrated in FIGS. 10A and 10B. In aspects, the variable curve portion follows a generally sinusoidal curve. The variable curve portion of the mount 950 further permits the stretch-mount clamp assembly 900 to be further adjustable to various bundle diameters, enabling the stretch-mount clamp assembly 900 to further stretch to secure elongated items into a bundle while maintaining a compact shape. The variable curve portion may be overmolded with elastic material of a tension device.

As illustrated in FIGS. 10A and 10B, the tension devices (e.g., first tension device 930, second tension device 940) of the stretch-mount clamp assembly 900 permit the stretch-mount clamp assembly 900 to be further adjustable to various bundle diameters. A bundle size in FIG. 10A is larger than a bundle size in FIG. 10B. FIGS. 10A and 10B illustrate the tension devices stretching from a first length to a second length to secure elongated items into a bundle. In FIG. 10A, the elongated items have a combined diameter that is larger than the at-rest diameter of the stretch-mount clamp assembly 900. The tension devices stretch, as does the interconnect section 990, to enable the second connector 920 to engage the first connector 910. In FIG. 10B, one or both of the tension devices and the interconnect section 990 may remain compressed and not stretch, based on the smaller bundle size. The adjustability of the connection and/or the elastic properties of the tension devices and/or interconnect section 990 may enable a user to vary the amount of tension applied to the elongated object(s) retained by the stretch-mount clamp assembly 900. In this way, the stretch-mount clamp assembly 900 may provide adjustable tension.

Figures 11A, 11B:
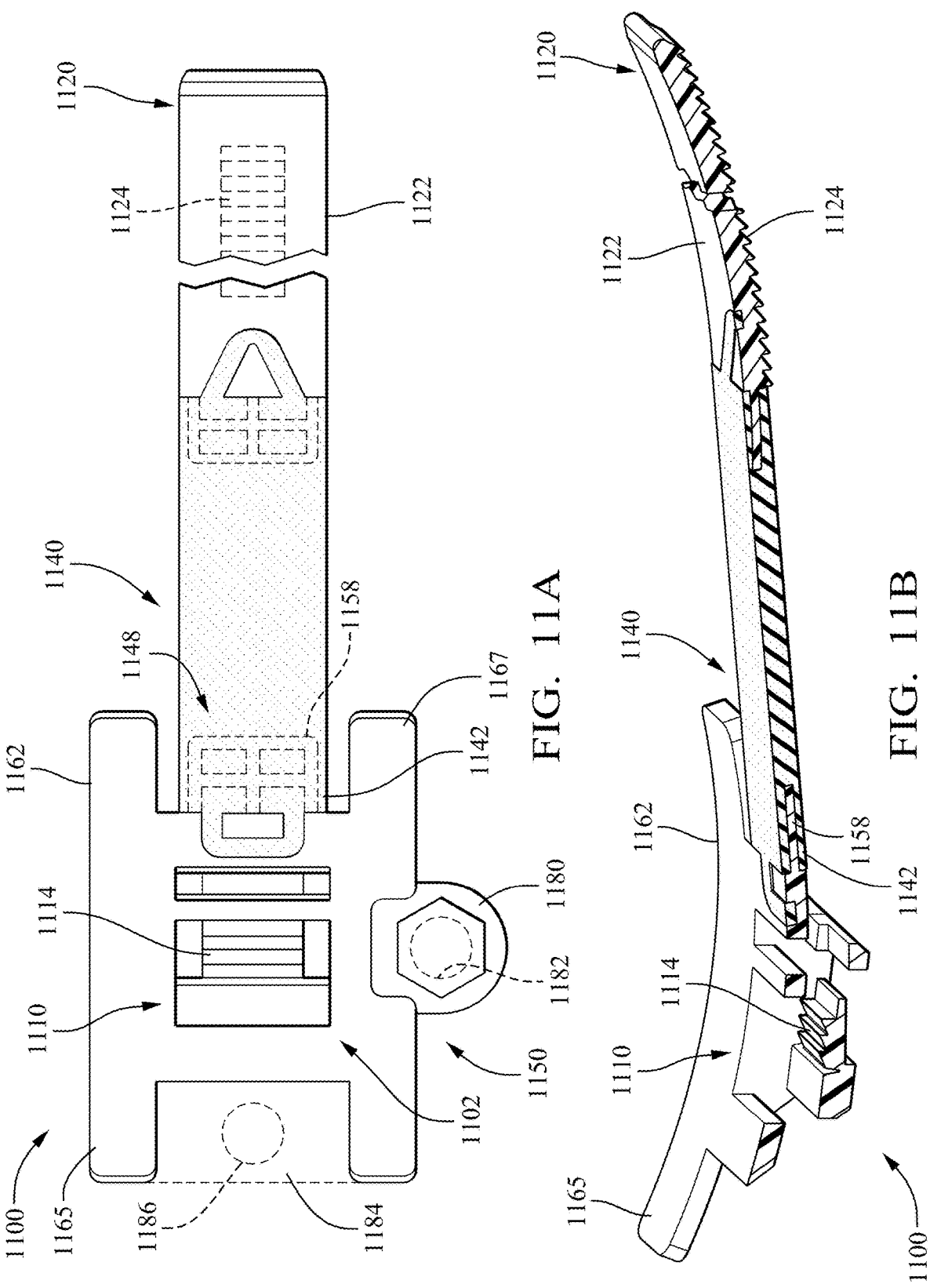
FIG. 11A is a plan view of a stretch-mount clamp assembly.
FIG. 11B is a partial, cross-sectional perspective view of the stretch-mount clamp assembly of FIG. 11A.
Figure 12:
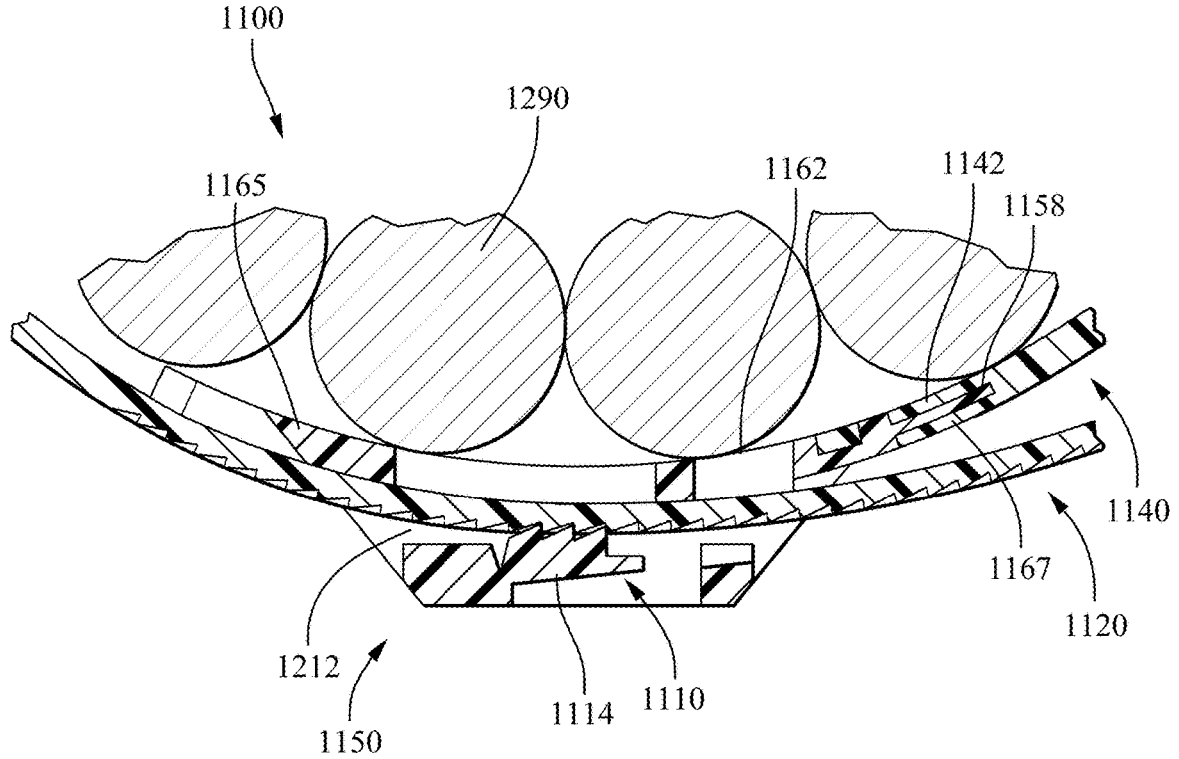
FIG. 12 is a partial, cross-sectional side view of the stretch-mount clamp assembly of FIG. 11A, in use.

Another stretch-mount clamp assembly 1100 is illustrated in FIGS. 11A, 11B, and 12. In this aspect, the stretch-mount clamp assembly 1100 is a combination saddle mount with integral strap and retainer. The stretch-mount clamp assembly 1100 is similar to the stretch-mount clamp assembly 900 illustrated in FIG. 9 and described above, except as detailed below. Thus, the stretch-mount clamp assembly 1100 includes a first connector 1110 of a first non-elastic material, a second connector 1120 of a second non-elastic material, and a tension device 1140 of an elastic material. The first connector 1110 may include a mount portion 1150 of a third non-elastic material, which is configured for mounting to a support structure. Two or more of the first, second, and third non-elastic materials may be the same non-elastic material.

The first connector 1110 is configured for connecting with the second connector 1120 to form a loop, as partially illustrated in FIG. 12.

The stretch mount clamp assembly 1100 includes a lock mechanism 1102 configured for locking the stretch mount clamp assembly 1100 around the elongated object(s) 1290 to form a bundle. The lock mechanism 1102 may include a slotted opening 1212 that extends through the first connector 1110. The slotted opening 1212 configured to receive therethrough a tongue member 1122 extending from the second connector 1120, as described above with respect to FIG. 2. In aspects, the slotted opening 1212 may be configured for receiving and storing an excess portion of a tension device and/or a tongue, for example when a stretch-mount clamp assembly is used to form a loop around a smaller bundle. The slotted opening 1212 may include a pawl 1114 of a pawl mechanism. The pawl 1114 configured for engaging one or more serrations 1124 defined on or in the tongue member 1122 to allow unidirectional movement of the tongue member 1122 through the slotted opening 1212 in a first direction and resist movement of the tongue member 1122 in an opposite direction. The pawl may be releasable via a release feature that is configured to enable a user to insert a finger, fingernail, or tool (e.g., screwdriver) in between the pawl and/or the tongue member to release the engagement of the pawl teeth from the serrations and permit the movement of the tongue member out of the slotted opening in a second direction opposite to the first direction.

The first connector 1110 includes a retainer 1158 that extends therefrom. The tension device 1140 connects between the second connector 1120 and the first connector 1110. The tension device 1140 includes an overmold portion 1142 that is overmolded onto at least a portion of the retainer 1158 to form a first mechanical interlock 1148. The mount portion 1150 may include a saddle section 1162. The saddle section 1162 is configured to receive the bundle of objects (e.g., object 1290) and may include one or more support rails (e.g., support rail 1165, support rail 1167) configured for contacting and supporting the bundle.

The stretch-mount clamp assembly 1100 may further include a mounting element 1180. In aspects, the mounting element 1180 extends from the first connector 1110. The mounting element 1180 configured for facilitating mounting of the stretch-mount clamp assembly 1100 to a support structure, for example, via a threaded fastener that is configured to extend through an orifice 1182 defined in the mounting element 1180 and into a threaded hole (not illustrated) in the support structure (not illustrated). The orifice 1182 may include a hexagonal-shaped recess configured to nest the head of a bolt or a nut to allow for securing before or after a bundle is routed across the saddle. In aspects, such as is illustrated in FIG. 11A, the orifice may align with the bundle routing axis or other type mounting features (e.g., fir tree, arrowhead, stud mount). FIG. 11A further illustrates, in dotted line fashion, another example position of the mounting element, as a second mounting element 1184 with an orifice 1186. The second mounting element 1184 with an orifice 1186 are not illustrated in FIG. 11B or FIG. 12, for clarity.

The mounting element (e.g., mounting element 1180, mounting element 1184) may be integrally formed with the mount portion 1150. For example, the mounting element may be overmolded with the material of the mount portion 1150. The mounting element may be fabricated of any suitably resilient material, including non-elastic materials (e.g., metal). In aspects, the mounting element may be co-molded with the first connector 1110.

Figure 13:
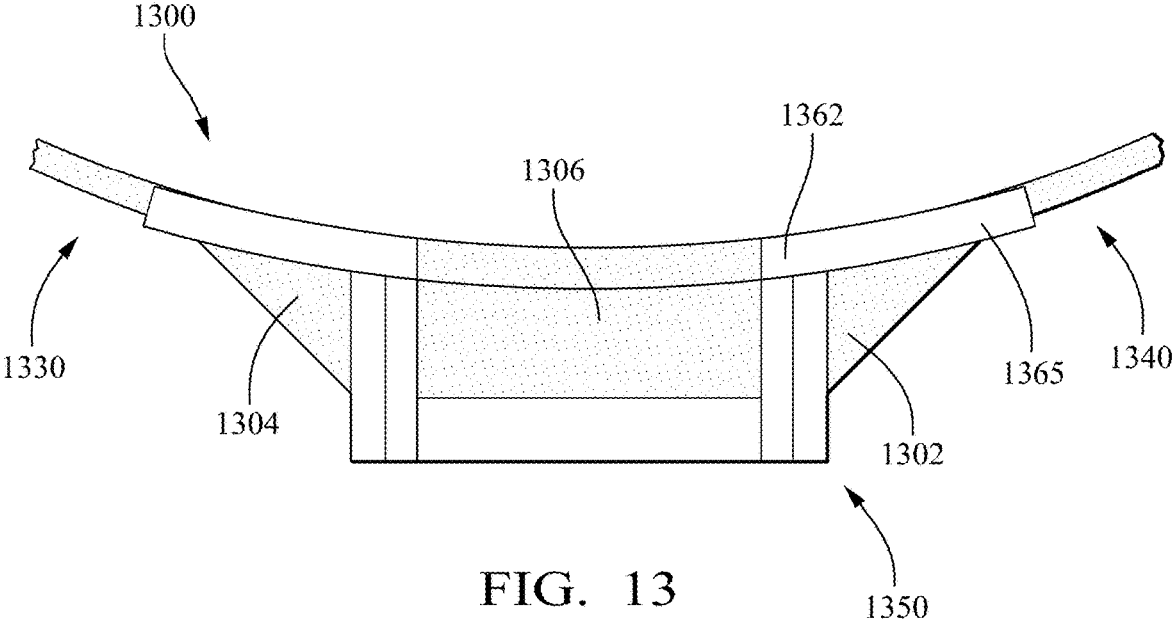
FIG. 13 is an elevation view of a stretch-mount clamp assembly.

FIG. 13 is an elevation view of an additional stretch-mount clamp assembly 1300. In this aspect, the stretch-mount clamp assembly 1300 is a hybrid clamp tie. The stretch-mount clamp assembly 1300 is similar to the stretch-mount clamp assembly 900 illustrated in FIG. 9 and described above, except as detailed below. Thus, the stretch-mount clamp assembly 1300 includes a first connector of a first non-elastic material, a second connector of a second non-elastic material, a first tension device 1330 of a first elastic material, a second tension device 1340 of a second elastic material, and a mount 1350 of a third non-elastic material. Two or more of the first, second, and third non-elastic materials may be the same non-elastic material. The first tension device 1330 connects between the first connector and the mount 1350, and the second tension device 1340 connects between the second connector and the mount 1350. The first connector is configured for connecting with the second connector to form a loop. The mount 1350 includes a saddle section 1362. The saddle section 1362 is configured to receive a bundle and may include one or more support rails (e.g., support rail 1365) configured for contacting and supporting the bundle. The mount 1350 may further include one or more gussets (e.g., gusset 1302, gusset 1304) formed of an elastic material (e.g., the elastic material of one or both of the first tension device 1330 or the second tension device 1340). Further, a midsection 1306 of the mount 1350 may be formed of the elastic material. The gussets and/or midsection 1306 may further enable the saddle section 1362 to conform to various bundle diameters.

Figure 14:
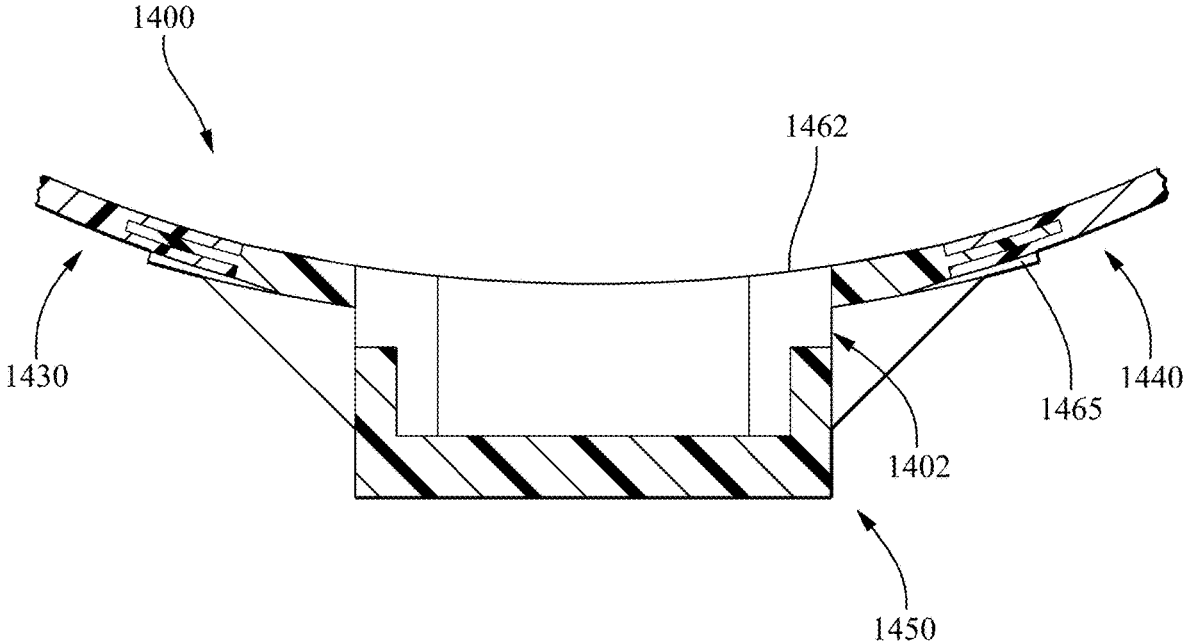
FIG. 14 is an elevation view of a stretch-mount clamp assembly.

FIG. 14 is an elevation view of an additional stretch-mount clamp assembly 1400. In this aspect, the stretch-mount clamp assembly 1400 is a hybrid clamp tie. The stretch-mount clamp assembly 1400 is similar to the stretch-mount clamp assembly 900 illustrated in FIG. 9 and described above, except as detailed below. Thus, the stretch-mount clamp assembly 1400 includes a first connector of a first non-elastic material, a second connector of a second non-elastic material, a first tension device 1430 of a first elastic material, a second tension device 1440 of a second elastic material, and a mount 1450 of a third non-elastic material. Two or more of the first, second, and third non-elastic materials may be the same non-elastic material. The first tension device 1430 connects between the first connector and the mount 1450, and the second tension device 1440 connects between the second connector and the mount 1450. The first connector is configured for connecting with the second connector to form a loop. The mount 1450 includes a saddle section 1462. The saddle section 1462 is configured to receive a bundle and may include one or more support rails (e.g., support rail 1465) configured for contacting and supporting the bundle. The mount 1450 may further include a passage 1402 defined therein that is configured for receiving and storing an excess portion of the first connector (e.g., a tongue member) and/or an excess portion of a tension device (e.g., first tension device 1430, second tension device 1440, strap), for example when the stretch-mount clamp assembly 1400 is used to form a loop around a smaller bundle.

Some additional examples of stretch-mount clamp assemblies are as follows:

Example 1. A stretch-mount clamp assembly comprising: a first connector comprising a first non-elastic material, the first connector having an inner side opposite an outer side, the first connector including a first retainer extending from the inner side of the first connector; a second connector comprising a second non-elastic material, the second connector having an inner side opposite an outer side, the second connector including a second retainer extending from the inner side of the second connector; and a tension device comprising an elastic material, the tension device connecting the inner side of the first connector to the inner side of the second connector, the tension device including a first overmold portion that is overmolded onto at least a portion of the first retainer to form a first mechanical interlock and a second overmold portion that is overmolded onto at least a portion of the second retainer to form a second mechanical interlock.

Example 2. The stretch-mount clamp assembly of Example 1, wherein the overmolding of the first overmold portion onto the at least a portion of the first retainer to form the first mechanical interlock chemically bonds the first retainer to the tension device, and wherein the overmolding of the second overmold portion onto the at least a portion of the second retainer to form the second mechanical interlock chemically bonds the second retainer to the tension device.

Example 3. The stretch-mount clamp assembly of Example 1, wherein the first retainer includes a first upper surface opposite a first lower surface and the first mechanical interlock comprises at least one first interlock orifice defined between the first upper surface and the first lower surface, the first interlock orifice extending through the first retainer, and wherein the second retainer includes a second upper surface opposite a second lower surface and the second mechanical interlock comprises at least one second interlock orifice defined between the second upper surface and the second lower surface, the second interlock orifice extending through the second retainer.

Example 4. The stretch-mount clamp assembly of Example 3, wherein the elastic material of the tension device extends through the first interlock orifice to provide a first mechanical interlock and through the second interlock orifice to provide a second mechanical interlock.

Example 5. The stretch-mount clamp assembly of Example 1, wherein the elastic material comprises at least one of butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber, styrene-butadiene, styrene-butadiene rubber (SBR), silicone rubber, or polybutadiene.

Example 6. The stretch-mount clamp assembly of Example 1, wherein the first and second non-elastic materials are a same non-elastic material, and the same non-elastic material is at least one of polyamide, polypropylene, polyethylene, polyphenylene sulfide, polyether ether ketone, polyaryletherketone, polyacetal, polybutylene terephthalate, or copolymers, blends, or alloys thereof.

Example 7. The stretch-mount clamp assembly of Example 1, wherein the first and second connectors are different connectors, wherein the first connector is a first clamp member, the second connector is a second clamp member, and the first and second clamp members are configured to connect together, further comprising: a slotted opening defined by the first clamp member; a tongue member projecting from the second clamp member, the tongue member including a plurality of serrations extending along a length of the tongue member and across a width of the tongue member, the tongue member configured to be received in the slotted opening; and a pawl defined in the first clamp member, the pawl having a plurality of teeth disposed within the slotted opening, the plurality of teeth configured to interlock with the plurality of serrations when the tongue member is inserted into the slotted opening.

Example 8. The stretch-mount clamp assembly of Example 1, wherein the tension device includes a variable curve portion elastically extensible in a longitudinal direction of the tension device.

Example 9. The stretch-mount clamp assembly of Example 1, wherein at least one of the first connector or the second connector includes an arcuately shaped profile having at least one overmolded ridge formed of the elastic material of the tension device.

Example 10. A stretch-mount clamp assembly comprising: a first connector comprising a first non-elastic material, the first connector having an inner side opposite an outer side, the first connector including a first retainer extending from the inner side of the first connector; a mount portion comprising a second non-elastic material, the mount portion having a first end opposite a second end, the mount portion including a first center retainer extending from the mount portion first end and a second center retainer extending from the mount portion second end; a first tension device comprising a first elastic material, the first tension device connecting the inner side of the first connector to the first end of the mount portion, the first tension device including a first overmold portion that is overmolded onto at least a portion of the first retainer to form a first mechanical interlock and a second overmold portion that is overmolded onto at least a portion of the first center retainer to form a second mechanical interlock; a second connector comprising a third non-elastic material, the second connector having an inner side opposite an outer side, the second connector including a second retainer extending from the inner side of the second connector; and a second tension device comprising a second elastic material, the second tension device connecting the inner side of the second connector to the second end of the mount portion, the second tension device including a third overmold portion that is overmolded onto at least a portion of the second retainer to form a third mechanical interlock and a fourth overmold portion that is overmolded onto at least a portion of the second center retainer to form a fourth mechanical interlock.

Example 11. The stretch-mount clamp assembly of Example 10, wherein the overmolding of the first overmold portion onto the at least a portion of the first retainer to form the first mechanical interlock chemically bonds the first retainer to the first tension device, wherein the overmolding of the second overmold portion onto the at least a portion of the first center retainer to form the second mechanical interlock chemically bonds the first center retainer to the first tension device, wherein the overmolding of the third overmold portion onto the at least a portion of the second retainer to form the third mechanical interlock chemically bonds the second retainer to the second tension device, and wherein the overmolding of the fourth overmold portion onto the at least a portion of the second center retainer to form the fourth mechanical interlock chemically bonds the second center retainer to the second tension device.

Example 12. The stretch-mount clamp assembly of Example 10, wherein each of the first retainer and the second retainer includes a first upper surface opposite a first lower surface and at least one mechanical interlock, the mechanical interlock comprising at least one first interlock orifice defined between the first upper surface and the first lower surface, the first interlock orifice extending through the first retainer, and the elastic material of the respective tension device extends through the first interlock orifice to provide mechanical interlocks.

Example 13. The stretch-mount clamp assembly of Example 10, wherein the first and second elastic materials are at least one of butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber), styrene-butadiene, styrene-butadiene rubber (SBR), silicone rubber, or polybutadiene, and wherein the first, second, and third non-elastic materials are a same non-elastic material.

Example 14. The stretch-mount clamp assembly of Example 10, wherein the first and second connectors are different connectors, wherein the first connector is a first clamp member, the second connector is a second clamp member, and the first and second clamp members are configured to connect together.

Example 15. The stretch-mount clamp assembly of Example 14, further comprising: a slotted opening defined by the first clamp member; a tongue member projecting from the second clamp member, the tongue member including a plurality of serrations extending along a length of the tongue member and across a width of the tongue member, the tongue member configured to be received in the slotted opening; and a pawl defined in the first clamp member, the pawl having a plurality of teeth disposed within the slotted opening, the plurality of teeth configured to interlock with the plurality of serrations when the tongue member is inserted into the slotted opening.

Example 16. The stretch-mount clamp assembly of Example 15, wherein the first retainer includes a first upper surface opposite a first lower surface and the first mechanical interlock comprises at least one first interlock orifice defined between the first upper surface and the first lower surface, the first interlock orifice extending through the first retainer, and wherein the second retainer includes a second upper surface opposite a second lower surface and the second mechanical interlock comprises at least one second interlock orifice defined between the second upper surface and the second lower surface, the second interlock orifice extending through the second retainer.

Example 17. The stretch-mount clamp assembly of Example 16, wherein the elastic material of the first tension device extends through the first interlock orifice to provide a first mechanical interlock and the elastic material of the second tension device extends through the second interlock orifice to provide a second mechanical interlock.

Example 18. The stretch-mount clamp assembly of Example 10, wherein the elastic material comprises at least one of butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber), styrene-butadiene, styrene-butadiene rubber (SBR), silicone rubber, or polybutadiene.

Example 19. The stretch-mount clamp assembly of Example 10, wherein the first and second non-elastic materials are a same non-elastic material.

Example 20. The stretch-mount clamp assembly of Example 19, wherein the same non-elastic material is at least one of polyamide, polypropylene, polyethylene, polyphenylene sulfide, polyether ether ketone, polyaryletherketone, polyacetal, polybutylene terephthalate, or copolymers, blends, or alloys thereof.

Although implementations for stretch-mount clamp assemblies have been described in language specific to certain features and/or methods, the subject of the appended claims is not necessarily limited to the specific features or methods described. Rather, the specific features and methods are disclosed as example implementations for stretch-mount clamp assemblies.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A stretch-mount clamp assembly comprising:
a first connector comprising a first non-elastic material, the first connector having an inner side opposite an outer side, the first connector including a first retainer extending from the inner side of the first connector;
a mount portion comprising a second non-elastic material, the mount portion having a first end opposite a second end, the mount portion including a first center retainer extending from the mount portion first end and a second center retainer extending from the mount portion second end;
a first tension device comprising a first elastic material, the first tension device connecting the inner side of the first connector to the first end of the mount portion, the first tension device including a first overmold portion that is overmolded onto at least a portion of the first retainer to form a first mechanical interlock and a second overmold portion that is overmolded onto at least a portion of the first center retainer to form a second mechanical interlock;
a second connector comprising a third non-elastic material, the second connector having an inner side opposite an outer side, the second connector including a second retainer extending from the inner side of the second connector; and
a second tension device comprising a second elastic material, the second tension device connecting the inner side of the second connector to the second end of the mount portion, the second tension device including a third overmold portion that is overmolded onto at least a portion of the second retainer to form a third mechanical interlock and a fourth overmold portion that is overmolded onto at least a portion of the second center retainer to form a fourth mechanical interlock.

2. The stretch-mount clamp assembly of claim 1,
wherein the overmolding of the first overmold portion onto the at least a portion of the first retainer to form the first mechanical interlock chemically bonds the first retainer to the first tension device,
wherein the overmolding of the second overmold portion onto the at least a portion of the first center retainer to form the second mechanical interlock chemically bonds the first center retainer to the first tension device,
wherein the overmolding of the third overmold portion onto the at least a portion of the second retainer to form the third mechanical interlock chemically bonds the second retainer to the second tension device, and wherein the overmolding of the fourth overmold portion onto the at least a portion of the second center retainer to form the fourth mechanical interlock chemically bonds the second center retainer to the second tension device.

3. The stretch-mount clamp assembly of claim 1, wherein each of the first retainer and the second retainer includes a first upper surface opposite a first lower surface and at least one mechanical interlock, the at least one mechanical interlock comprising at least one first interlock orifice defined between the first upper surface and the first lower surface, the first interlock orifice extending through the first retainer, and the elastic material of the respective tension device extends through the first interlock orifice to provide mechanical interlocks.

4. The stretch-mount clamp assembly of claim 1, wherein the first and second elastic materials are at least one of butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber), styrene-butadiene, styrene-butadiene rubber (SBR), silicone rubber, or polybutadiene, and wherein the first, second, and third non-elastic materials are a same non-elastic material.

5. The stretch-mount clamp assembly of claim 1, wherein the first and second connectors are different connectors, wherein the first connector is a first clamp member, the second connector is a second clamp member, and the first and second clamp members are configured to connect together.

6. The stretch-mount clamp assembly of claim 5, further comprising:

a slotted opening defined by the first clamp member;

a tongue member projecting from the second clamp member, the tongue member including a plurality of serrations extending along a length of the tongue member and across a width of the tongue member, the tongue member configured to be received in the slotted opening; and a pawl defined in the first clamp member, the pawl having a plurality of teeth disposed within the slotted opening, the plurality of teeth configured to interlock with the plurality of serrations when the tongue member is inserted into the slotted opening.

7. The stretch-mount clamp assembly of claim 6, wherein the first retainer includes a first upper surface opposite a first lower surface and the first mechanical interlock comprises at least one first interlock orifice defined between the first upper surface and the first lower surface, the first interlock orifice extending through the first retainer, and wherein the second retainer includes a second upper surface opposite a second lower surface and the second mechanical interlock comprises at least one second interlock orifice defined between the second upper surface and the second lower surface, the second interlock orifice extending through the second retainer.

8. The stretch-mount clamp assembly of claim 7, wherein the elastic material of the first tension device extends through the first interlock orifice to provide a first mechanical interlock and the elastic material of the second tension device extends through the second interlock orifice to provide a second mechanical interlock.

9. The stretch-mount clamp assembly of claim 1, wherein at least one of the first elastic material or the second elastic material comprises at least one of butyl rubber, ethylene propylene diene monomer (EPDM) rubber, polyisoprene, neoprene, fluoroelastomer, ethylene propylene rubber (EPR), ethylene-vinyl acetate (EVA), poly(acrylic acid) (PAA), latex, natural latex rubber, polyurethane, nitrile rubber, acrylonitrile butadiene rubber), styrene-butadiene, styrene-butadiene rubber (SBR), silicone rubber, or polybutadiene.

10. The stretch-mount clamp assembly of claim 1, wherein the first and second non-elastic materials are a same non-elastic material.

11. The stretch-mount clamp assembly of claim 10, wherein the same non-elastic material is at least one of polyamide, polypropylene, polyethylene, polyphenylene sulfide, polyether ether ketone, polyaryletherketone, polyacetal, polybutylene terephthalate, or copolymers, blends, or alloys thereof.

* * * * *